US009502902B2

(12) United States Patent
Mumtaz

(10) Patent No.: US 9,502,902 B2
(45) Date of Patent: Nov. 22, 2016

(54) SYSTEM, METHOD AND APPARATUS FOR GENERATING LAYOUT OF DEVICES IN SOLAR INSTALLATIONS

(75) Inventor: Asim Mumtaz, Redwood City, CA (US)

(73) Assignee: SolarCity Corporation, San Mateo, CA (US)

( * ) Notice: Subject to any disclaimer, the term of this patent is extended or adjusted under 35 U.S.C. 154(b) by 683 days.

(21) Appl. No.: 13/533,945

(22) Filed: Jun. 26, 2012

(65) Prior Publication Data

US 2013/0346054 A1 Dec. 26, 2013

(51) Int. Cl.
*G06F 17/50* (2006.01)
*H02J 3/38* (2006.01)
*H02J 13/00* (2006.01)

(52) U.S. Cl.
CPC .............. *H02J 3/383* (2013.01); *H02J 13/002* (2013.01); *Y02E 10/563* (2013.01); *Y02E 40/72* (2013.01); *Y04S 10/123* (2013.01)

(58) Field of Classification Search
USPC ........................................................... 703/1
See application file for complete search history.

(56) References Cited

U.S. PATENT DOCUMENTS

| 5,565,855 | A | 10/1996 | Knibbe |
| 8,391,031 | B2 | 3/2013 | Garrity |
| 8,391,032 | B2 | 3/2013 | Garrity et al. |
| 8,542,512 | B2 | 9/2013 | Garrity |
| 8,823,212 | B2 | 9/2014 | Garrity et al. |
| 8,934,269 | B2 | 1/2015 | Garrity |
| 2002/0080027 | A1 | 6/2002 | Conley, III |
| 2002/0149950 | A1 | 10/2002 | Takebayashi |
| 2005/0201397 | A1 | 9/2005 | Petite |
| 2008/0294472 | A1 | 11/2008 | Yamada |
| 2009/0160395 | A1 | 6/2009 | Chen |
| 2009/0283129 | A1 | 11/2009 | Foss |
| 2010/0052425 | A1 | 3/2010 | Moore et al. |
| 2011/0282600 | A1 | 11/2011 | Roesner et al. |
| 2012/0057388 | A1 | 3/2012 | Garrity |
| 2012/0058733 | A1 | 3/2012 | Jovicic et al. |
| 2012/0065803 | A1 | 3/2012 | Teichmann et al. |
| 2012/0133208 | A1 | 5/2012 | Kalhoff et al. |
| 2012/0154162 | A1* | 6/2012 | Vandevelde ........ H01L 31/0547 340/635 |
| 2013/0229842 | A1 | 9/2013 | Garrity |

(Continued)

FOREIGN PATENT DOCUMENTS

| CN | 101674032 | 3/2010 |
| EP | 1748576 | 1/2007 |

(Continued)

OTHER PUBLICATIONS

Patwari et al. "Using Proximity and Quantized RSS for Sensor Localization in Wireless Networks", Copyright 2003 ACM 1-58113-764-8/03/0009.*

(Continued)

*Primary Examiner* — Saif Alhija
(74) *Attorney, Agent, or Firm* — Kilpatrick Townsend & Stockton LLP

(57) ABSTRACT

For an array of installed energy harvesting devices, a method of gathering information about individual devices in the array and generating a layout or map of the installed devices based on the gathered information is provided. A communications gateway or a base station gathers the information and determines the positions of individual micro-inverters. The gathered information is used to generate a topological or geometrical map of the installed devices.

23 Claims, 25 Drawing Sheets

(56) References Cited

U.S. PATENT DOCUMENTS

2014/0265579 A1 9/2014 Mumtaz
2015/0022006 A1 1/2015 Garrity et al.

FOREIGN PATENT DOCUMENTS

| EP | 1623495 | 10/2009 |
|----|---------|---------|
| EP | 2169847 | 3/2010 |
| EP | 2485361 | 8/2012 |
| EP | 2901539 | 8/2015 |
| WO | WO 2005/053189 | 6/2005 |
| WO | WO 2008/112080 | 9/2008 |
| WO | WO2014/001756 | 1/2014 |
| WO | WO2014/106745 | 7/2014 |

OTHER PUBLICATIONS

U.S. Appl. No. 14/537,032, filed Nov. 10, 2014, Enecsys Limited.
International Preliminary Report on Patentability for PCT/GB2013/051529, Dec. 31, 2014 (Issuance date), Enecsys Limited.
International Preliminary Report on Patentability for PCT/GB2014/050005, Jul. 7, 2015 (Issuance date), Enecsys Limited.
U.S. Appl. No. 14/446,319, filed Jul. 29, 2014, Enecsys Limited.
International Search Report and Written Opinion for PCT/GB2014/050005, May 28, 2014 (mailing date), Enecsys Limited.
International Search Report and Written Opinion for PCT/GB2013/051529, Feb. 20, 2014 (mailing date), Enecsys Limited.

* cited by examiner

SYSTEM, METHOD AND APPARATUS FOR GENERATING LAYOUT OF DEVICES IN SOLAR INSTALLATIONS

BACKGROUND

In recent years there has been a re-emergence of interest in module-integrated electronics. The solar micro-inverter in particular has been noted as a product that has a number of benefits over the existing conventional solutions. These benefits include: improved energy harvest over the life of the installation, particularly in scenarios of shading or other causes of mismatch in solar photovoltaic (PV) installations; low voltage DC (less than 80V from a single panel), which is safer and significantly reduces arcing faults. Additional benefits of an energy harvesting system based on micro-inverters also include the ability to pin point failures or problems with solar panels (or solar modules), and the scalability by adding panels to an installation. The installation process itself is also extremely easy and can be considered as a plug and play method.

Solar micro-inverters enable true plug and play installation of solar PV modules. The ease with which these can be installed is a major selling point for the solar industry. One additional task that has to be undertaken with micro-inverters is manually producing a physical layout description of the solar PV installation.

This is currently done in a number of ways. However, each of the existing methods is a manual process that uses pen and paper or labels to record the specific location of the solar micro-inverters and their respective panels in an installation. One of the methods is simply drawing the layout of the installation or using a CAD layout of the installation and writing down the serial numbers associated with each location. Another method is to have an additional removable label on each micro-inverter that can be peeled off and attached to a pre-drawn layout. Another method would be to use an application that is run on a smart phone that uses the camera on the phone to create layout of the installation. These manual methods add a layer of administration to the installer's workload and are error prone.

What is needed is a method or apparatus that enables each installed micro-inverters to self-register its serial number and location so a physical layout description of the solar PV installation can be automatically produced.

SUMMARY

For an array of installed energy harvesting devices, some embodiments of the invention provides a method of gathering information about individual devices in the array and generating a layout or map of the installed devices based on the gathered information. In some embodiments, a communications gateway or a base station gathers the information and either uses the gathered information to generate a topological or geometrical map of the installed devices, or passes this gathered information to a computer that generates such a map.

Each energy-harvesting device includes a micro-inverter for converting energy from photovoltaic modules into AC output in some embodiments. The micro-inverters are equipped with communications devices such as wireless transceivers. In some embodiments, the micro-inverters are in a wireless communications network with the communications gateway. The information about the individual micro-inverters are gathered and transmitted to the communications gateway. In some embodiments, the communications gateway is communicatively coupled with a server, which receives the gathered information and generates the map of the installed devices.

The method of some embodiments receives from each of the energy harvesting devices a unique identifier (ID). The received IDs are used to identify individual devices in a generated map. The received IDs are also used to label gathered information as being associated with individual installed devices. In some embodiments, the method receives a set of relative positioning information from each of the energy harvesting devices. Based on the received relative positioning information, some embodiments compute a coarse relative position for each of the installed devices. Based on the computed coarse relative positions and the computed referential measurement, some embodiments determine the exact position for each of the installed energy harvesting devices. Some embodiments report the exact positions of each of the installed micro-inverters in an installation layout.

Different embodiments generate the map differently by gathering different types of information about the individual micro-inverters. In some embodiments, the gathered information of a micro-inverter includes a global positioning coordinate, which can be provided by a Global Positioning System (GPS) receiver embedded in the micro-inverter, or by a mobile device such as a smart phone that is equipped with GPS receiver and placed near the micro-inverter.

In some embodiments, the micro-inverters are installed according to a particular sequence. A micro-inverter that is newly installed according to the particular sequence generates a time stamp at the moment that it is installed and activated (i.e., connected to the photovoltaic module and receives power.) The timestamps of the micro-inverters are sent to the communications gateway along with the micro-inverter's ID. The map of the installed devices is generated by sorting the micro-inverters along the particular sequence according to their timestamps. In some embodiments, micro-inverters that are installed across multiple rows can be detected and represented in the map by using sudden changes in wireless signal strength received at the micro-inverters to determine if a micro-inverter is installed at a new row.

Strengths of wireless links between micro-inverters and/or the communications gateway are used by some embodiments to determine the relative positions of the micro-inverters. From each micro-inverter, the link strength (expressed either as Receiver Signal Strength Indicator (RSSI) or Link Quality Indicator (LQI)) from neighboring micro-inverters are recorded and transmitted to the communications gateway. A matrix is constructed for determining relative positioning between micro-inverters by listing the link strengths between the micro-inverters in the installed array.

In some embodiments, anchor nodes with known positions are used to determine the positions of micro-inverters in the array and for generating the map of the installed devices. Some of the micro-inverters are used as anchor nodes in some of these embodiments. In some other embodiments, specialized installation anchor nodes that are not part of the installation array are used. The installation anchor nodes of some embodiments are equipped with GPS receivers.

Different embodiments have different numbers of anchor nodes. Some embodiments use information from two anchor nodes in addition to the link strength matrix to determine the exact position of each micro-inverter in the array. Some embodiments use three anchor nodes to triangulate the exact location of micro-inverters in the array. Some embodiments use four or more anchors to attain exact locations of the micro-inverters with higher accuracy.

The anchor nodes provide information for performing triangulation operations. Different embodiments triangulate based on different information from the anchor nodes. Some embodiments use link strengths between the micro-inverters and the anchor nodes. Some embodiments use signal time of arrival or different in time of arrival as basis of triangulation. Some embodiments use angles of incidence of signals from micro-inverters to anchors as basis of the triangulation.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
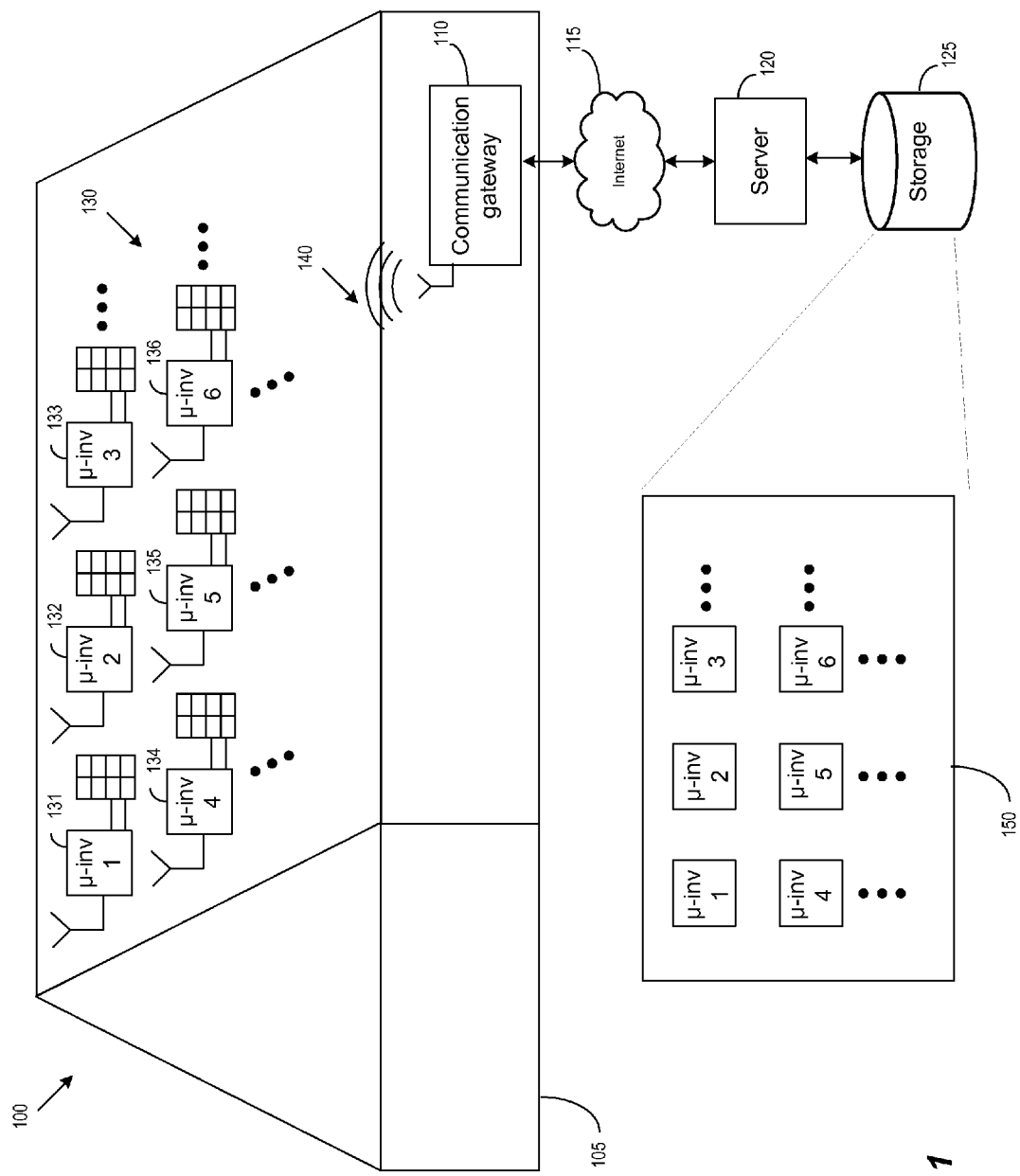
FIG. 1 illustrates the automatic generation of a solar-panel layout based on information provided by installed micro-inverters.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For an array of installed energy harvesting devices, some embodiments of the invention provides a method of gathering information about individual devices in the array and generating a layout or map of the installed devices based on the gathered information. In some embodiments, a communications gateway or a base station gathers the information and either uses the gathered information to generate a topological or geometrical map of the installed devices, or passes this gathered information to a computer that generates such a map.

Each energy-harvesting device includes a micro-inverter for converting energy from photovoltaic modules into AC output in some embodiments. The micro-inverters are equipped with communications devices such as wireless transceivers. In some embodiments, the micro-inverters are in a wireless communications network with the communications gateway. The information about the individual micro-inverters are gathered and transmitted to the communications gateway. In some embodiments, the communications gateway is communicatively coupled with a server, which receives the gathered information and generates the map of the installed devices.

The method of some embodiments receives from each of the energy harvesting devices a unique identifier (ID). The received IDs are used to identify individual devices in a generated map. The received IDs are also used to label gathered information as being associated with individual installed devices. In some embodiments, the method receives a set of relative positioning information from each of the energy harvesting devices. Based on the received relative positioning information, some embodiments compute a coarse relative position for each of the installed devices. Based on the computed coarse relative positions and the computed referential measurement, some embodiments determine the exact position for each of the installed energy harvesting devices. Some embodiments report the exact positions of each of the installed micro-inverters in an installation layout.

Different embodiments generate the map differently by gathering different types of information about the individual micro-inverters. In some embodiments, the gathered information of a micro-inverter includes a global positioning coordinate, which can be provided by a Global Positioning System (GPS) receiver embedded in the micro-inverter, or by a mobile device such as a smart phone that is equipped with GPS receiver and placed near the micro-inverter.

In some embodiments, the micro-inverters are installed according to a particular sequence. A micro-inverter that is newly installed according to the particular sequence generates a time stamp at the moment that it is installed and activated (i.e., connected to the photovoltaic module and receives power.) The timestamps of the micro-inverters are sent to the communications gateway along with the micro-inverter's ID. The map of the installed devices is generated by sorting the micro-inverters along the particular sequence according to their timestamps. In some embodiments, micro-inverters that are installed across multiple rows can be detected and represented in the map by using sudden changes in wireless signal strength received at the micro-inverters to determine if a micro-inverter is installed at a new row.

Strengths of wireless links between micro-inverters and/or the communications gateway are used by some embodiments to determine the relative positions of the micro-inverters. From each micro-inverter, the link strength (expressed either as Receiver Signal Strength Indicator (RSSI) or Link Quality Indicator (LQI)) from neighboring micro-inverters are recorded and transmitted to the communications gateway. A matrix is constructed for determining relative positioning between micro-inverters by listing the link strengths between the micro-inverters in the installed array.

In some embodiments, anchor nodes with known positions are used to determine the positions of micro-inverters in the array and for generating the map of the installed devices. Some of the micro-inverters are used as anchor nodes in some of these embodiments. In some other embodiments, specialized installation anchor nodes that are not part of the installation array are used. The installation anchor nodes of some embodiments are equipped with GPS receivers.

Different embodiments have different numbers of anchor nodes. Some embodiments use information from two anchor nodes in addition to the link strength matrix to determine the exact position of each micro-inverter in the array. Some embodiments use three anchor nodes to triangulate the exact location of micro-inverters in the array. Some embodiments use four or more anchors to attain exact locations of the micro-inverters with higher accuracy.

The anchor nodes provide information for performing triangulation operations. Different embodiments triangulate based on different information from the anchor nodes. Some embodiments use link strengths between the micro-inverters and the anchor nodes. Some embodiments use signal time of arrival or different in time of arrival as basis of triangulation. Some embodiments use angles of incidence of signals from micro-inverters to anchors as basis of the triangulation.

FIG. 1 illustrates the automatic generation of a solar-panel layout based on information provided by installed micro-inverters. As shown in the figure, an energy harvesting system 100 harvests solar power from photovoltaic cells in solar panels. The harvested solar energy is converted into electricity via an array 130 of micro-inverters, which are coupled to the solar panels and are installed on a roof of a building 105. The micro-inverters in the energy harvesting system 100 are also in a communication system 140 based on a communication gateway 110, which gathers information from the installed array of micro-inverters 130. The information gathered by the communications gateway 110 is then sent to a server 120 via the Internet 115. The information is used to generate an installation layout 150 and stored in storage 125.

The communications system 140 communicatively couples the micro-inverters in the array 130 with the communications gateway 110 and allows information to be exchanged between devices in the communications system 140. In some embodiments, the communication system 140 is a wireless communication system. The communication system 100 can be implemented in any one of a number of wireless communication systems such as ZigBee, Wifi, Bluetooth, Wireless MBus, etc. Though not illustrated, instead of or in addition to wireless systems, some embodiments use power line communication, in which a data signal is modulated over a lower frequency carrier signal that is typical of mains voltage. In some embodiments, wireless transceivers in the micro-inverters are only used for determining the positions of the micro-inverters; data communication to and from the micro-inverters in some of these embodiments use other means such as power line communications.

The communications gateway 110 is the hub of the communication system 140. This is the case whether the communication system 140 is a wireless system or a power line based system. The communications gateway 110 is also referred to as the installation coordinator in some embodiments.

The communication gateway 110 receives communication from some or all of the installed micro-inverters in the system. In some embodiments, it also receives communications from anchor nodes (not illustrated). Anchor nodes are micro-inverters or installation devices with known positions that can be used to ascertain the exact location of micro-inverters. Anchor nodes will be further described below in Section IV. In some embodiments, the communications gateway 110 is equipped with computing components capable of analyzing information gathered from the micro-inverters and/or the anchor nodes. The communications gateway 110 generates the installation layout locally in some of these embodiments. The locally generated layout or map can either be viewed locally at the communications gateway 110 or be delivered to the server 120.

The server 120 receives data gathered or generated by the communications gateway 110. FIG. 1 illustrates the server 120 as being accessible by the communications gateway 110 via the Internet 115. In some other embodiments (not illustrated), the server is accessible to the communications gateway 110 by other means. For example the server 120 can be connected to the communications gateway via local area network via wired or wireless network. The server 120 and the communications gateway 110 can also reside on a same computing device that performs the functions of both the server 120 and the communications gateway 110. On the server 120 resides the database storage 125, which stores the data collected from individual micro-inverters. The server 120 uses the data collected from the individual micro-inverters to generate the installation layout 150. In some embodiments, the server 120 is part of a device (e.g., a computing device with display capabilities) that allows the viewing of the installation layout 150 at the server 120. In some embodiments, the generated map or installing layout is pushed up to a website or another server, which allows end users to view the installation layout.

The micro-inverters in the array 130 such as micro-inverters 131-136 receives DC voltage generated by the solar photovoltaic panels and converts the received DC voltage into AC electricity. Descriptions of micro-inverters can be found in U.S. patent application Ser. No. 13/244,155 and U.S. patent application Ser. No. 13/244,161. U.S. patent application Ser. No. 13/244,155 and U.S. patent application Ser. No. 13/244,161 are hereby incorporated by reference. In addition to the components necessary for converting DC voltage from solar panels to AC electricity, the micro-inverters also include the components necessary for communications within the communications network 140. In some embodiments, the communications components residing within the micro-inverters (e.g., 131-136) are radio frequency (RF) circuitry for wireless communications with the communications gateway 110. In some embodiments, components for other means of communications (e.g., power line communications) are included.

In addition to using the wireless/RF system for communications, some embodiments also use the RF circuitry of the micro-inverters for ascertaining the location, or positioning of the micro-inverters. In the example of FIG. 1, each micro-inverter in the array 130 sends information regarding its self-recognized position to the server 120 via the communications gateway 110. Different embodiments use different RF techniques for micro-inverters to self-recognize their positions. In some embodiments, the RF techniques used by micro-inverters to recognize their own positions provide a coarse layout of the installation, which may need to be fine tuned by the user or installer. In some embodiments, the RF technique used is capable of providing an accurate layout of the installation, which would not require further adjustments by the user or installer. Some of these different embodiments will be further described below in Sections I-V. In addition to sending information of its own position, a micro-inverter in some embodiments also sends a unique identification (e.g., a serial number) to the server 120 via the communications gateway 110. An example micro-inverter will be described below by reference to FIG. 2.

The server 120 includes the storage 125, which is used to store data collected from individual micro-inverters and anchor nodes. A computing device having access to the storage 125 can use the collected data to generate the installation layout 180. In some embodiments, such a computing device is part of the server 120. In some embodiments, the installation layout is computed and generated by another computer using the information stored in the storage 125. Such a computer can be a computer in real-time communication with the communications system 140 (e.g., being in a same network) such that the computer can generate the installation layout in real-time. Alternatively, such a computer can receive the information from the storage 125 at a later time via storage mediums such as flash drives.

The installation layout 150 is a map that details the positions of the micro-inverters in the array 130. A displaying device having access to the installation layout 150 (either at the communications gateway 110 or at the server 120) can be used to view the installation layout. The installation layout 150 is generated based on the information gathered by the communications gateway 110. The installation layout 150 in some embodiments includes identifiers (e.g., serial number) of the micro-inverters, the locations of the micro-inverters, and the dimensions of micro-inverters and/or of the solar panels. In some embodiments, the location information in the installation layout details the absolute geographical or physical locations of the micro-inverters (such as GPS coordinates). In some embodiments, the location information in the installation layout includes only relative positions or relationships between the micro-inverters in the array.

Such information can be presented textually or graphically. Graphical presentation of the installation layout can be as a topological or geometrical map of the installed devices. A geometrical map in some embodiments includes graphical representations of micro-inverters and solar panels that are geometrically drawn to scale. A topological map in some embodiments is one that has been simplified so that only vital information remains and unnecessary detail has been removed. These maps may lack scale in distance and direction, but the spatial relationships between the micro-inverters are maintained. In some embodiments, the topological map shows the relative positions of the micro-inverters within the installed array.

In addition to micro-inverters, the installation layout of some embodiments includes representations for other components in the solar installation. Specifically, some embodiments gather information about other components such as power optimizers in the solar modules. The information of these other components is also included (textually or graphically) in the generated installation layout.

Figure 2:
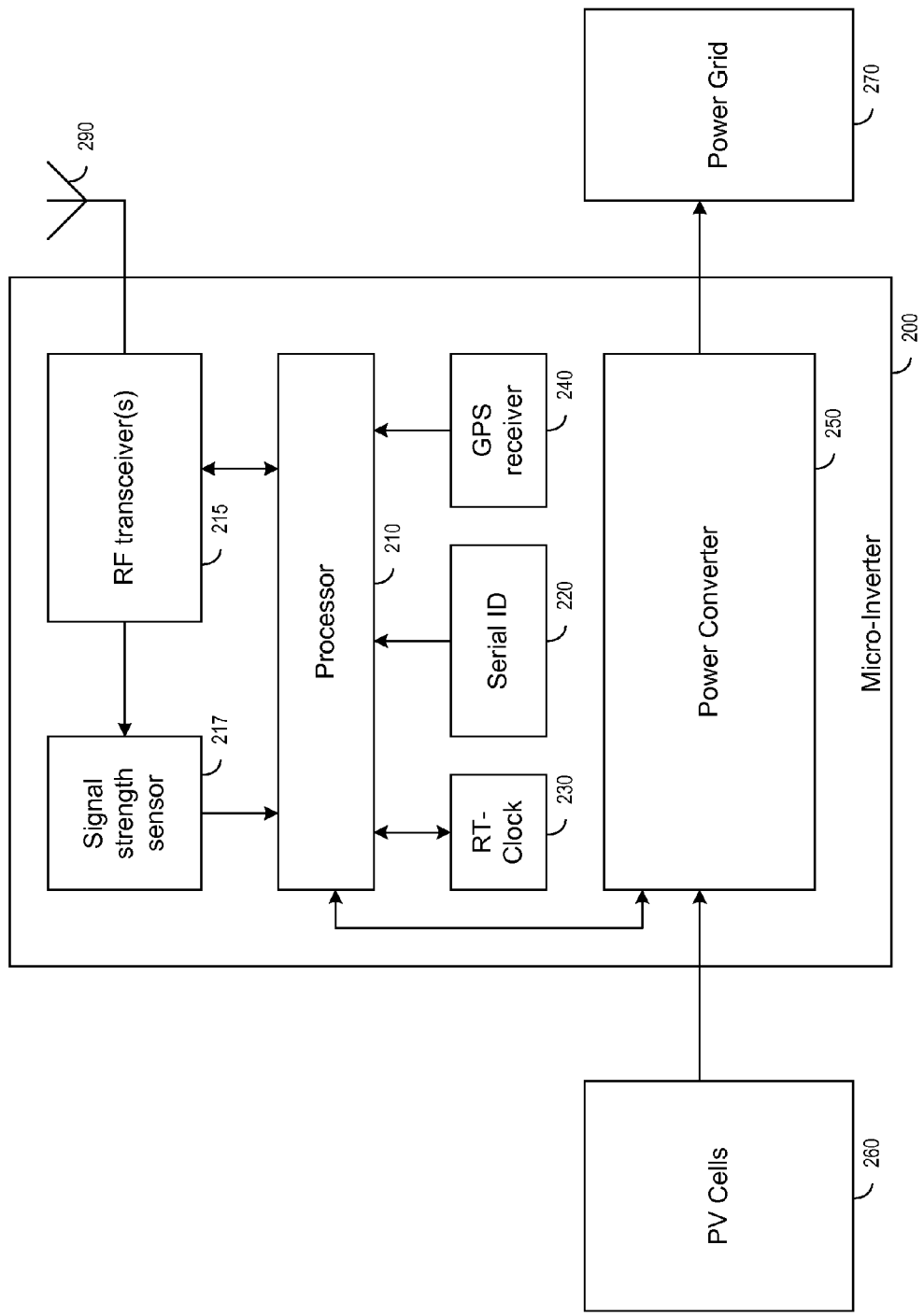
FIG. 2 illustrates a block diagram for a micro-inverter.

FIG. 2 illustrates a block diagram of a micro-inverter 200 that can be used to implement the array of micro-inverters 130 of FIG. 1 (i.e., each of the micro-inverters 131-136 can be implemented based on the micro-inverter 200). The micro-inverter 200 converts DC voltage generated by photovoltaic cells 260 into AC electricity for power grid 270. The micro-inverter 270 also includes components necessary for determining its own location and/or for communications within a communications network. The micro-inverter 200 includes a processor 200, a transceiver(s) 215, an antenna 290, a signal strength sensor 217, a serial number 220, a real-time clock 230, a GPS receiver 240, and a power converter 250.

The power converter 250 converts the DC voltage received from the photovoltaic cell 260 to AC electricity for the power grid 270. In some embodiments, power converters are also referred to as power conditioning units. Descriptions of power converters or power conditioning units can be found in U.S. patent application Ser. No. 13/244,155, U.S. patent application Ser. No. 13/244,161, and U.S. patent application Ser. No. 13/310,691. In some embodiments, various components in the micro-inverter 200 (e.g., the processor 210 and the RF transceiver 215) are powered by energy from the photovoltaic cell 260. In some of these embodiments, the solar power is provided via the power converter 250.

Some of the operations performed by the power converter 250 are monitored and controlled by the processor 210. In some embodiments, the power converter 250 includes its own micro-controller(s) for controlling the transfer of power from the PV cell 260 to the power grid 270 (e.g., by controlling the transistor drivers in the power converter 250), and the processor 210 monitors and controls the power converter 250 by communicating with the micro-controller (s) in the power converter 250. In some other embodiments, the transfer of power in the power converter 250 is controlled by a micro-controller (or processor) that also controls the communications of the micro-inverter 200.

The RF transceiver 215 transmits and receives RF signals to and from one or more other RF capable devices via the antenna 290. In the example of FIG. 1, the RF transceivers in the micro-inverters 131-136 transmit and receive RF signals to and from the communications gateway 110. In some embodiments, the RF transceivers in the micro-inverters 131-136 transmit and receive RF signals to and from other micro-inverters in the array 130 in a mesh-like manner. In some embodiments, the RF transceivers 215 transmit and receive RF signals to and from anchor nodes for ascertaining the position of the micro-inverter 200. In some embodiments, the RF transceiver 215 includes multiple RF transceivers for transmitting and receiving RF signals to and from multiple RF capable devices simultaneously.

In some embodiments, the RF transceiver 215 is used to communicate and exchange data with other devices in a RF communications network (e.g., 140) via the RF signals being received. In some of these embodiments, the micro-inverters 131-136 communicate with the communications gateway 110 and/or other micro-inverters in the array 130. In some other embodiments, the RF receiver 215 is only used for determining the position of the micro-inverter 200 but not for communications. In some of these embodiments, the micro-inverter 200 includes one or more communications components (such as for performing power line communications) for sending and receiving data.

The strength of the RF signal received by the RF transceiver 215 is measured by the signal strength sensor 217. The signal strengths detected by the signal strength sensors in individual micro-inverters are used by some embodiments to determine the position of the micro-inverters. In some embodiments, the micro-inverter 200 performs RSSI and/or LQI measurement based on the RF signal received. In some of these embodiments, the signal strength sensor 200 provides raw measurements to the processor 210 to compute RSSI or LQI values. In some other embodiments, the micro-inverter 200 does not include the signal strength sensor 217, and the processor 210 computes the RSSI or LQI readings directly based on the data received by the RF transceiver 215.

The processor 210 controls the communication between the micro-inverter 200 and other devices. The processor 210 receives demodulated data from the RF transceiver 215. The process 210 also produces data to be modulated and transmitted by the RF transceiver 215. In addition to processing data being transmitted or received by the RF transceiver 215, the processor 210 also receives readings provided by the signal strength sensor 217, the real-time clock 230, the GPS receiver 240, and the serial number 220. The content of the real-time clock 230 in some embodiments can be updated by the processor 215 based on the communications with other devices. The processor 215 produces the transmit data for the RF transceiver 215 based on some or all of these readings. In some embodiments that do not use the RF transceiver for data communications, the processor 210 goes through another communications component (e.g., a module for power line communications, not illustrated) for transmitting and receiving data.

In some embodiments, the processor 215 is a microprocessor that executes a set of instructions for producing the transmit data for the RF transceiver. For example, in some embodiments, the processor 210 composes data packets to be transmitted by the RF transceiver 215 based on previously received data, the real-time clock (230), the serial number (220), the GPS coordinates (240), and the signal strength sensor reading (217). By receiving and transmitting these data, the micro-inverter 200 enables the energy harvesting system that includes the micro-inverter to automatically determine its position and generate an installation layout based on information provided by the micro-inverter.

In some embodiments, the processor 210 also controls and monitors the power converter 250. The processor 210 communicates with the power converter 250 and relay its status to other devices (e.g., the communications gateway) via the RF transceiver 215. In some other embodiments, the power transfer operation and the communications operation are performed by a single micro-controller or micro-processor.

Sections I-V below describes various techniques for generating the installation layout. Section I describes using GPS coordinates (such as provided by the GPS receiver 240) to generate the installation layout of the micro-inverters. Section II describes using installation order and time stamps (such as provided by real-time clocks 230) for determining the positions the micro-inverters in the array. Section III describes using signal strengths (such as provided by the signal strength sensor 217) for determining the positions of the micro-inverters in the array. Section IV describes the use of anchor nodes for determining the micro-inverters. Section V describes the use of hop-route for generating the installation layout.

I. Using GPS

The Global Positioning System (GPS) is a global navigation satellite system (GNSS) that provides reliable location and time information in all conditions at all times and from anywhere on Earth. In some embodiments, each anchor node includes a GPS chip. Using GPS in anchor nodes for determining positions of micro-inverters will be further described below by reference to FIGS. 12a and 14a. In some embodiments, each micro-inverter includes a GPS chip (such as the GPS receiver 240) as well. The exact positions of the installed micro-inverters can be exactly ascertained based on coordinates provided by the GPS chips in the micro-inverters.

GPS does have an error margin that is based on atmospheric distortion (e.g., predominantly in the ionosphere), satellite clock inaccuracies, and the travel delays of the satellite signals. The issue for the solar array is not the exact absolute accuracy of the location but the relative accuracy of the micro-inverters. So it does not matter if there is an error as long as all units are offset in the same direction. In this case the relative accuracy of the solution is sustained.

Figure 3:
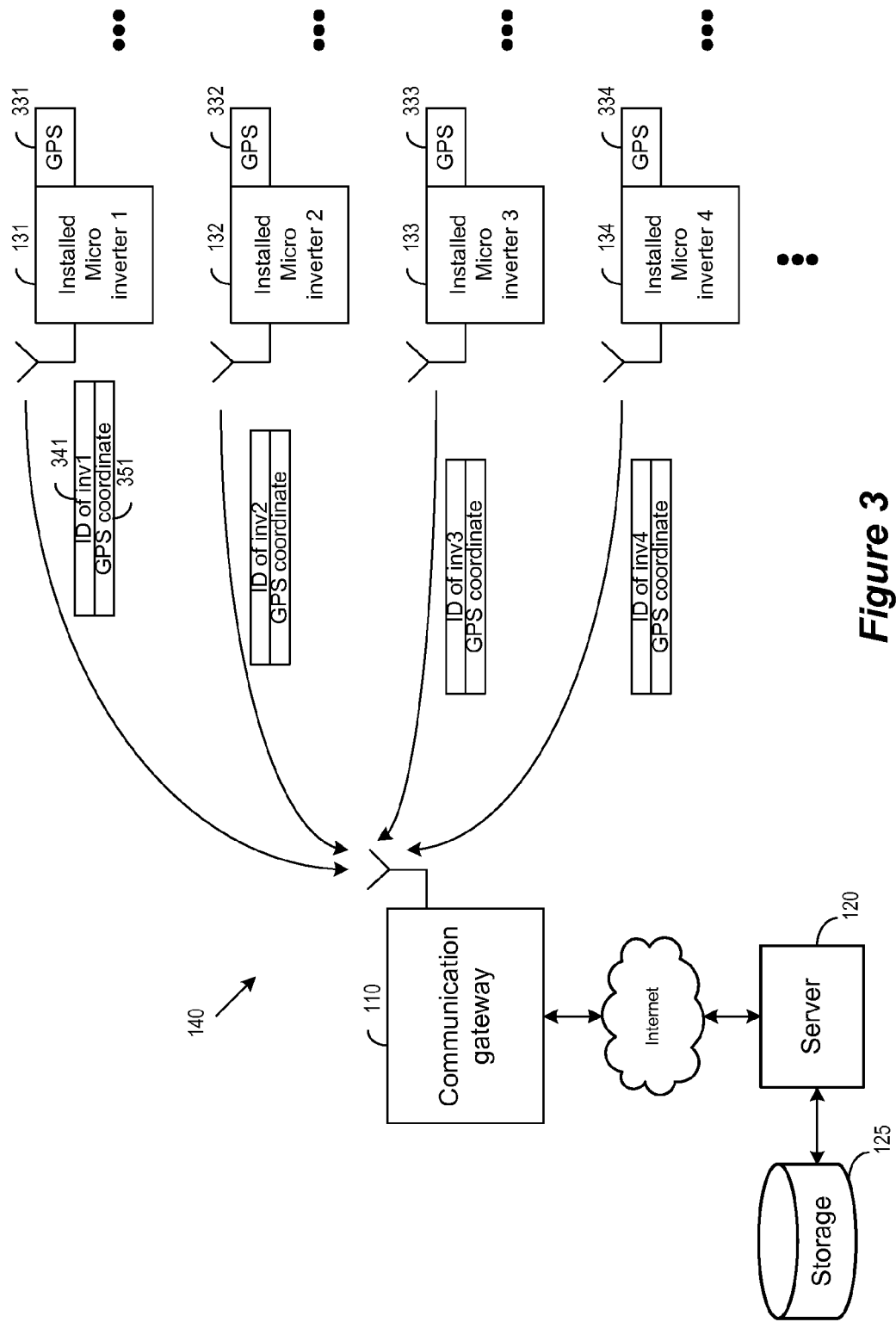
FIG. 3 illustrates the communications system in which installed micro-inverters are equipped with GPS functionalities.

FIG. 3 illustrates the communications system 140 in which installed micro-inverters are equipped with GPS functionalities. The installed micro-inverters 131-134 are equipped with GPS chips 331-334. The GPS function of each micro-inverter generates position information about the micro-inverter and forwards the position information to the communications gateway 110 of the communications system 140. Each micro-inverter also forwards its own unique identifying information to the communications gateway 100. The position information collected by the communications gateway (e.g., GPS coordinates of each micro-inverter)

are then sent to the server 120 and used to generate a layout or map of the installed micro-inverters to be stored in the storage 125.

Figure 4:
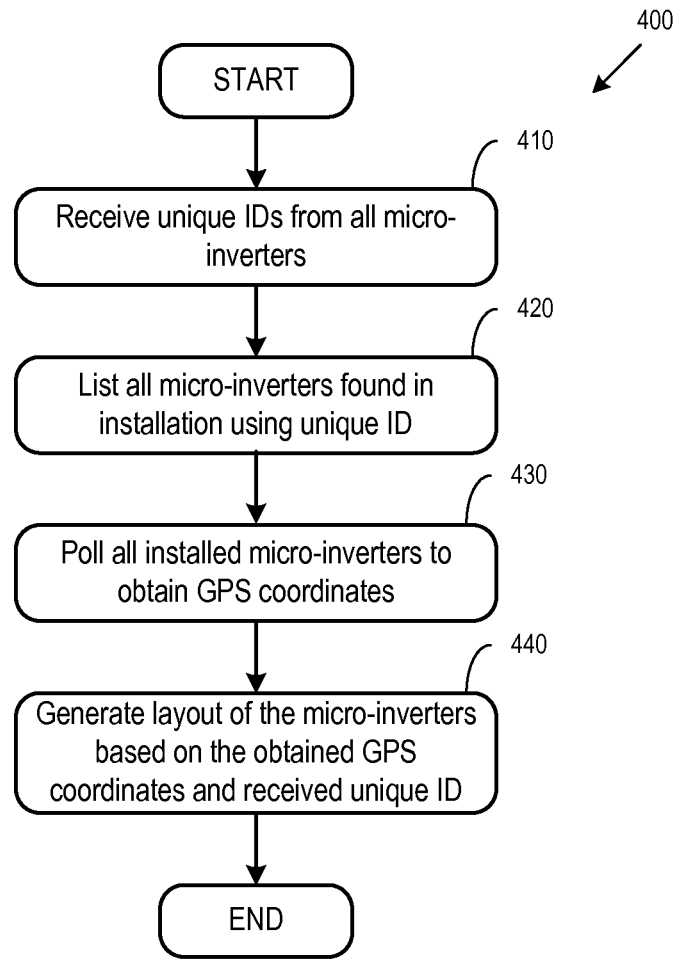
FIG. 4 conceptually illustrates a process for generating a map of the installed micro-inverters.

FIG. 4 conceptually illustrates a process 400 for generating a map of the installed micro-inverters. In some embodiments, the process 400 is performed by an installation coordinator similar to the communications gateway 110. The process receives (at 410) unique identifiers such as serial numbers from each of the micro-inverters. In the example of FIG. 3, the communications gateway 110 receives the identifier 341 from the micro-inverter 131. The process then lists (at 420) all micro-inverters found in the installation by using the received identifiers.

The process polls (at 430) each micro-inverter to obtain the GPS coordinate from the micro-inverters. In the example of FIG. 3, the GPS chip 331 determines the GPS coordinate 351 for the micro-inverter 131. The micro-inverter in turn sends its GPS coordinate 351 to the communications gateway 110 once the GPS chip has finished determining the micro-inverter's GPS coordinate.

The process generates (at 440) a layout of the micro-inverters based on the obtained GPS coordinates and received unique identifiers. In some embodiments, the process associates a GPS coordinate of a micro-inverter with the unique identifiers of the micro-inverter when generating the layout. After generating the layout, the process 400 ends.

One of ordinary skill will recognize that process 400 is an example of one possible process performed by some embodiments in order to generate the layout of installed micro-inverters based on GPS coordinates of micro-inverters. For example, the process can broadcast a polling command to the micro-inverters, and the micro-inverters respond by sending its unique identifiers together with its GPS coordinate. In other words, operations 410 and 420 can be performed after the operation 430.

Instead of using GPS coordinates determined locally by GPS chips in the micro-inverters, some embodiments obtain GPS coordinates for each of the micro-inverters from GPS equipped mobile devices. For some embodiments, FIG. 5 illustrates using GPS in a mobile device for determining positions of micro-inverters and for generating the installation layout.

As illustrated, an array 530 of micro-inverters (including micro-inverters 531-536) is installed on the building 505. The array 530 is in a wireless communications system 540 with a communications gateway 510, which is in communication with the Internet 515 and the server 520. However, unlike FIG. 3 in which micro-inverters 131-134 are equipped with GPS chips, micro-inverters 531-536 are not equipped with their own GPS chips. In order to generate an installation layout by using GPS coordinates of each of the micro-inverters, a GPS equipped mobile device 560 is used.

Figure 5:
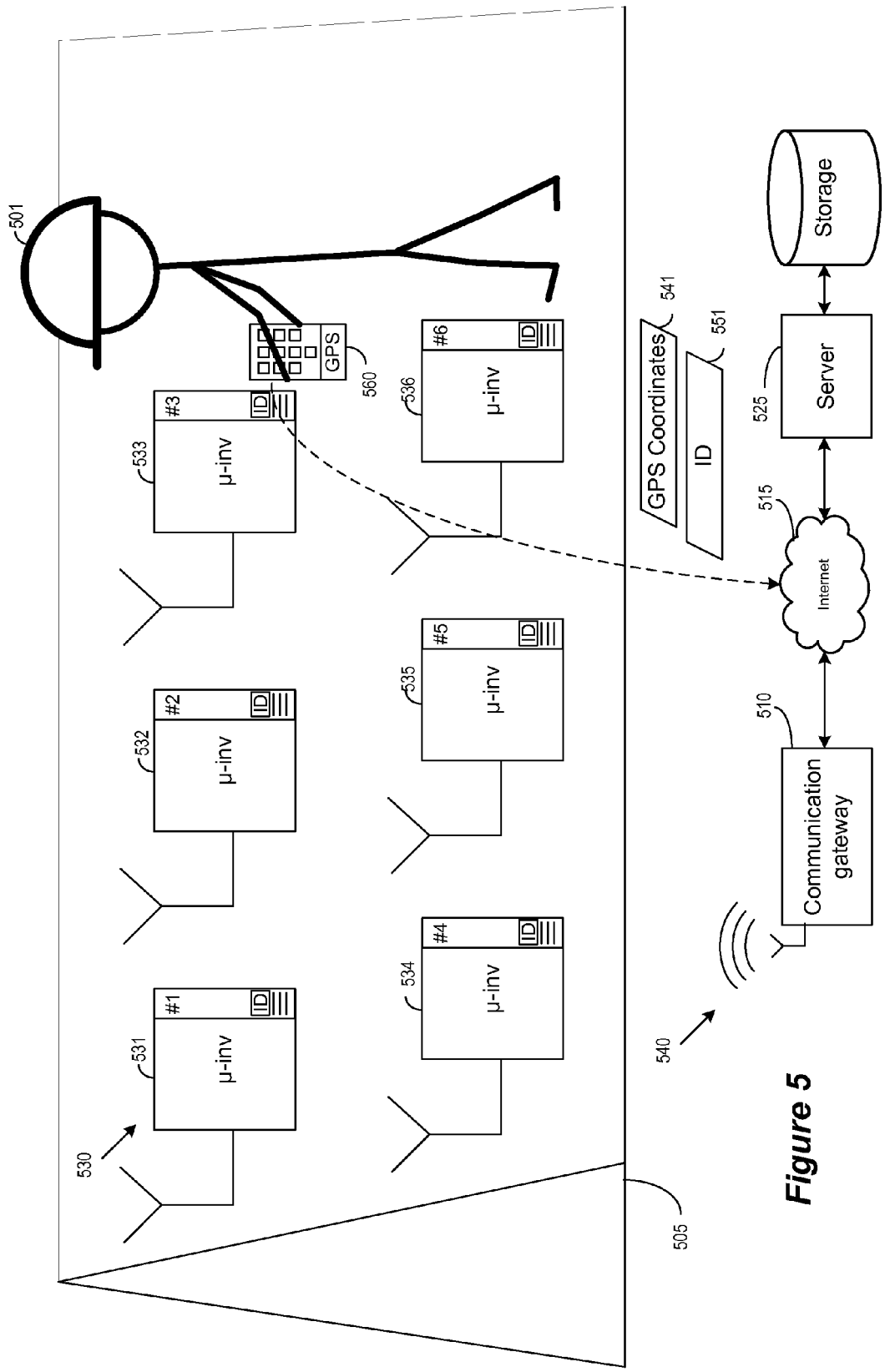
FIG. 5 illustrates using GPS in a mobile device for determining positions of micro-inverters and for generating the installation layout.

FIG. 5 illustrates an installer 501 carrying the GPS equipped mobile device 560 that is used to report the GPS coordinate of a micro-inverter 533. The mobile device 560 is physically close enough to the micro-inverter 533 such that the GPS coordinate of the mobile device 560 represents the location of the micro-inverter 533. The mobile device 560 then transmits this GPS coordinate 541 along with an identifier 551 for the micro-inverter 533 via Internet 515 to a server 525.

The mobile device 560 is equipped with GPS and can be carried to be physically near any object. Such mobile device can be a Smart phone, a PDA, a hand held GPS device, etc. When placed near a micro-inverter, the GPS reading of the mobile device 560 can be transmitted to the server 525 as the location of the micro-inverter. The mobile device 560 is also used to obtain the unique identifier (e.g., serial number) of the micro-inverter. In some embodiments, the unique identifier appears on the surface of the micro-inverter in machine-readable form (e.g., barcode) and can be scanned into the mobile device 560. In some embodiments, the unique identifier is manually entered into the mobile device 560.

The installer 501 carries the mobile device 560 near each of the micro-inverter in the array 530. The unique identifiers and the GPS coordinates of the micro-inverters (i.e., the GPS of the mobile device when near the individual micro-inverters) are transmitted to the server 525 via the Internet 515. In some embodiments, the mobile device 560 has access to the Internet (e.g., through a mobile phone network) and can directly transmit micro-inverter information to the server 525 through the Internet. In some embodiments (not illustrated), the mobile device participates in the communications system 540 and can transmit the micro-inverter information to the server via the communications gateway 510. The GPS coordinates and the micro-inverter identifiers received by the server 525 are then used to generate the installation layout of the installed micro-inverters.

In some embodiments, the communication gateway or installation coordinator uses the IP address and/or GPS location data that it gathered from anchor nodes or micro-inverters as an indicator of the installations location (i.e., which country or region). Using the information that could be gathered by the gateway or by the micro-inverter itself about which country or region it is being installed, some embodiments load the appropriate grid connection standards within the micro-inverter according to the location information that it gathers. This approach has the advantages of allowing a unit to configure itself and avoiding costs associated with manufacturing configuration, which includes costs of building and stocking different types of micro-inverters.

II. Using Installation Order and Time Stamps

In some embodiments, the micro-inverters are installed according to a particular sequence. In some of these embodiments, a micro-inverter that is newly installed according to the particular sequence generates a timestamp at the moment that it is installed and activated (i.e., connected to the photovoltaic cell and receive power). The generated timestamps of the micro-inverters are sent to a communications gateway along with the micro-inverter's identifier. Such timestamps in some embodiments are generated based on internal real time clocks of the micro-inverters.

In some embodiments, the timestamp of a micro-inverter is generated when the micro-inverter communicates with the communications gateway. In some of these embodiments, the timestamps are generated at the communications gateway. A timestamp associated with a micro-inverter is generated when the micro-inverter first appears in the communications network and starts to communicate with the communications gateway.

A map of the installed devices is generated by sorting the micro-inverters along the particular sequence according to their timestamps. In some embodiments, the particular sequence of installation allow micro-inverters to be installed across multiple rows, and sudden changes in wireless signal strength received at the micro-inverters are used to determine if a micro-inverter is installed at a new row.

A coordinator of the installation process (e.g., a communications gateway, which collects the information from the micro-inverters) registers new devices as they appear. In this way the time stamp of when a micro-inverter is connected to the photovoltaic panel would assist in identifying micro-inverters that are positioned next to each other. Solar panels can typically be installed in a very linear pattern. This could be from right to left across a row and the subsequent rows below in a similar fashion. Micro-inverters may initially all be installed across an installation and then the panels can then be added. Solar panels are usually added in this very regimental approach whereby nearest neighbors are added. This is mainly due to the way in which common bolts and fixtures are used for horizontally adjacent panels. Therefore, the point of connection of the solar photovoltaic panels to the micro-inverter can be used as an indication of their relative positions. If the solar panels are installed by adhering to a strict sequence, the time stamp of installation becomes useful in determining relative positions between micro-inverters.

Figure 6:
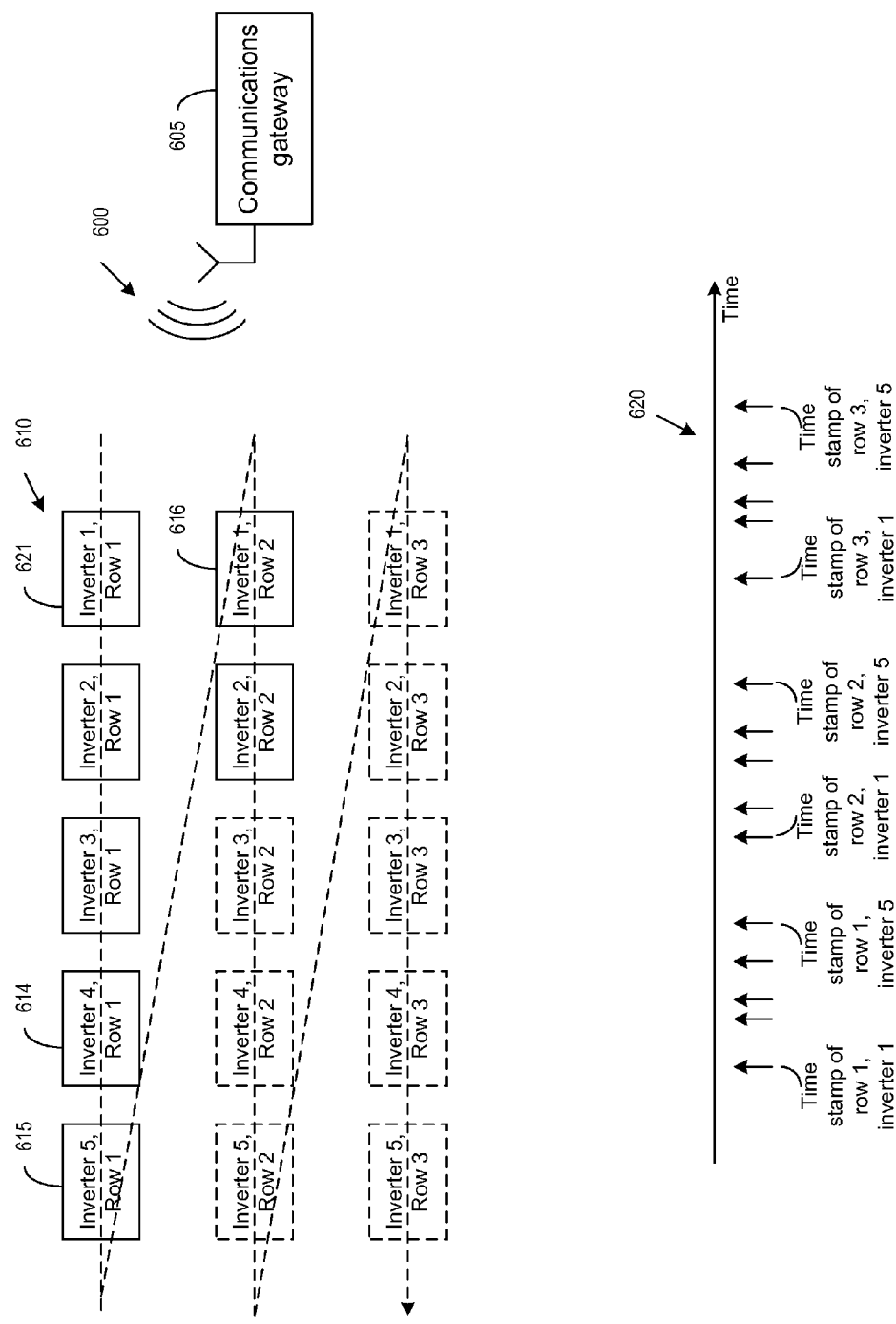
FIG. 6 illustrates using the time stamps of installation to determine relative positions of a micro-inverter with respect to its neighbors.

FIG. 6 illustrates using the time stamps of installation to determine relative positions of a micro-inverter with respect to its neighbors. The figure illustrates the relationship between the order of installation and the time stamp of the installation. FIG. 6 shows an array 610 of micro-inverters that has a layout of 3 rows and 5 columns. The micro-inverters in the array 610 are in a communications system 600 with a communications gateway 605, which uses RF signals to communicate with the micro-inverters and strength of the RF signals can be measured using Received Signal Strength Indicator (RSSI) or Link Quality Indicator (LQI). In this particular example, the communications gateway 605 is placed at the right side of the micro-inverter array (the start of each row).

The array 610 includes micro-inverters 615 and 616, which are the last micro-inverter in row 1 and the first micro-inverter in row 2, respectively. The dashed line through the micro-inverters in the array indicates the order by which the micro-inverters are installed. Specifically, the micro-inverters are installed from right to left; and when a row is filled up (5 micro-inverters per row), new micro-inverters are installed onto a new row from the right to the left. As each new micro-inverter is installed (e.g., snapped into place), a time stamp is generated by the newly installed micro-inverter. Once the time stamp is generated, the newly installed micro-inverter transmits the time stamp to the coordinator.

FIG. 6 also shows a timeline 620 that linearly lays out the time stamps according to the time they were captured. Micro-inverters with time stamps that are next to each other in the time line (i.e., consecutive) are also next to each other physically in the installed array, unless there is a row change (e.g., between micro-inverter 615 and 616). Some embodiments detect such row changes by detecting large changes in RSSI readings.

In some embodiments, the micro-inverter 621 (i.e., the first micro-inverter installed in the array 610) is used as a reference node, and the RSSI readings indicative of the signal strength between this reference micro-inverter 621 and other micro-inverters are used for detecting row change. Specifically, the communications gateway 605 will know when the first row is complete because there would be a step increase in RSSI data between the current installed micro-inverter to the top right hand micro-inverter (621) as compared to the previously installed micro-inverter. For example, when the micro-inverter 616 is being installed, there would be a step increase in RSSI compared to the previously installed micro-inverter 615.

In some other embodiments, other devices capable of RF communications with the micro-inverters in the array are used as reference node. Such a reference node in some embodiments has a known a location relative to the array but is not itself part of the array. Such a reference node can be a dedicated anchor node. Some examples of anchor nodes will be described below in Sections IV below. In some embodiments, the communications gateway of the array can be used as reference node. In these instances, the RSSI readings indicative of the signal strengths between the micro-inverters and the reference node are used instead. In some of these embodiments, the reference node (e.g., an anchor node or the communications gateway) is placed at a particular location relative to the array of micro-inverters.

In some other embodiments, instead of relying on a particular reference node (e.g., a corner micro-inverter or the communications gateway), some embodiments use RSSI readings between consecutive micro-inverters (i.e., micro-inverters that have consecutive time stamps) for detecting row changes.

Figure 7:
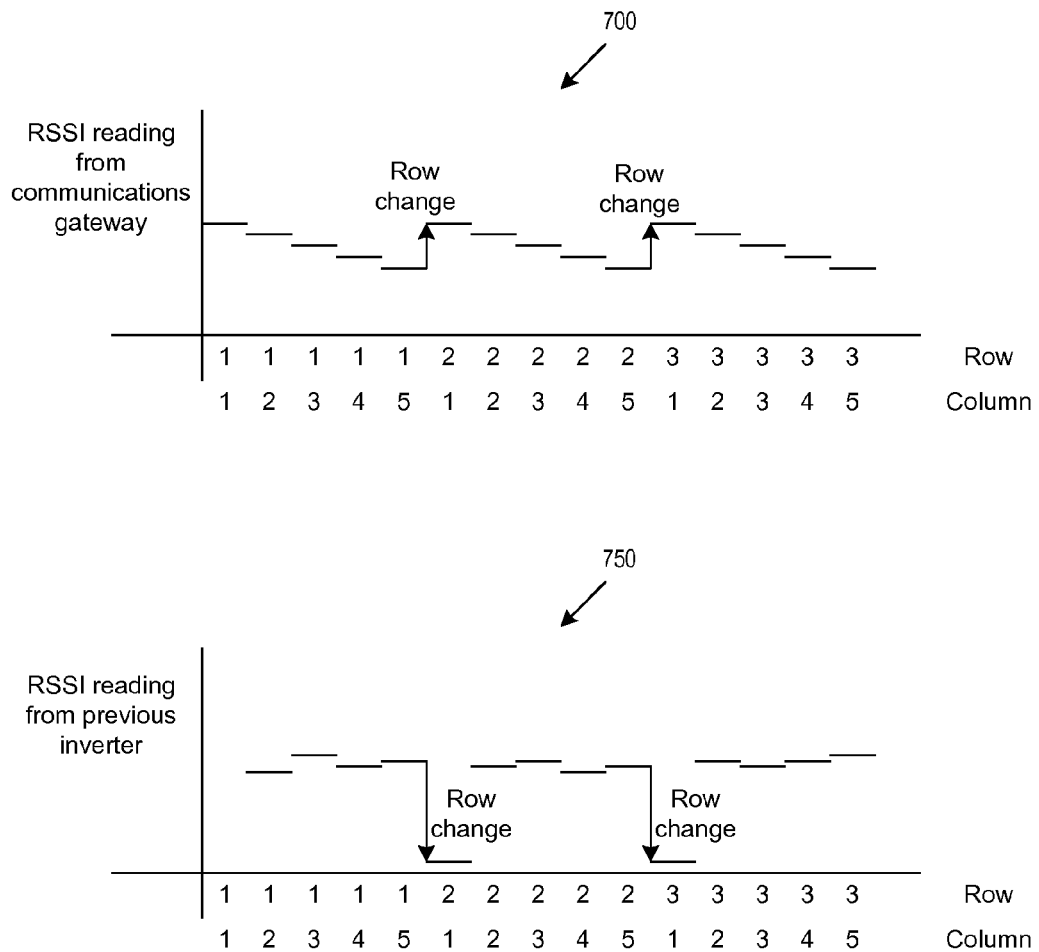
FIG. 7 illustrates using RSSI reading to detect row change during the installation of a micro-inverter array.

FIG. 7 illustrates using RSSI readings to detect row change during the installation of the micro-inverter array 610. The figure includes two RSSI plots 700 and 750 that plots RSSI readings for different micro-inverters according to the sequence of installation (and hence the ordering according to the installation time stamps). The RSSI plot 700 is the RSSI readings of signal strengths with a reference node (e.g., a micro-inverter at a corner of the array or the communications gateway). The RSSI plot 750 is the RSSI readings of signal strengths between consecutive micro-inverters (e.g., between micro-inverters 614 and 615).

In the RSSI plot 700, the RSSI readings from the micro-inverters in a same row (e.g., micro-inverters 1-5 in row 1) have comparable RSSI readings that fall off gradually, because they are spatially adjacent to each other and do not differ much distance wise from the RSSI reference node. However, the last micro-inverter of row 1 (615) and the first micro-inverter of row 2 (616), though having consecutive time stamps in the timeline 620, are far apart spatially. This spatial disparity shows up as a jump in RSSI reading going from row 1, column 5 (micro-inverter 615, which is far from the RSSI reference 605) to row 2, column 1 (micro-inverter 616, which is much closer to the RSSI reference 605). This detected jump in RSSI reading can thus be used to detect row change during installation.

In some embodiments that use corner micro-inverters as reference nodes, different micro-inverters are used as reference nodes in order to improve accuracy. For example, the micro-inverter 621 is used as the reference node for the micro-inverters in the first row, the micro-inverter 616 is used as the reference node for the micro-inverters in the second row, etc. The communications gateway 605 in some of these embodiments sets a micro-inverter at the start of a new row as the reference node for the new row upon detecting a row change.

In the RSSI plot 750, the RSSI readings from the micro-inverters in a same row have comparable RSSI readings, because they are spatially adjacent to each other and spaced apart fairly evenly. For example, micro-inverters 614 and 615 would have comparable RSSI readings because they are both in row 1 and adjacent to each other. However, the last micro-inverter of row 1 (615) and the first micro-inverter of row 2 (616), though having consecutive time stamps in the timeline 620, are far apart spatially. This spatial disparity shows up as a steep drop in RSSI reading going from row 1, column 5 (micro-inverter 615) to row 2, column 1 (micro-inverter 616). This detected drop in RSSI reading can also be used to detect row change during installation.

Figure 8:
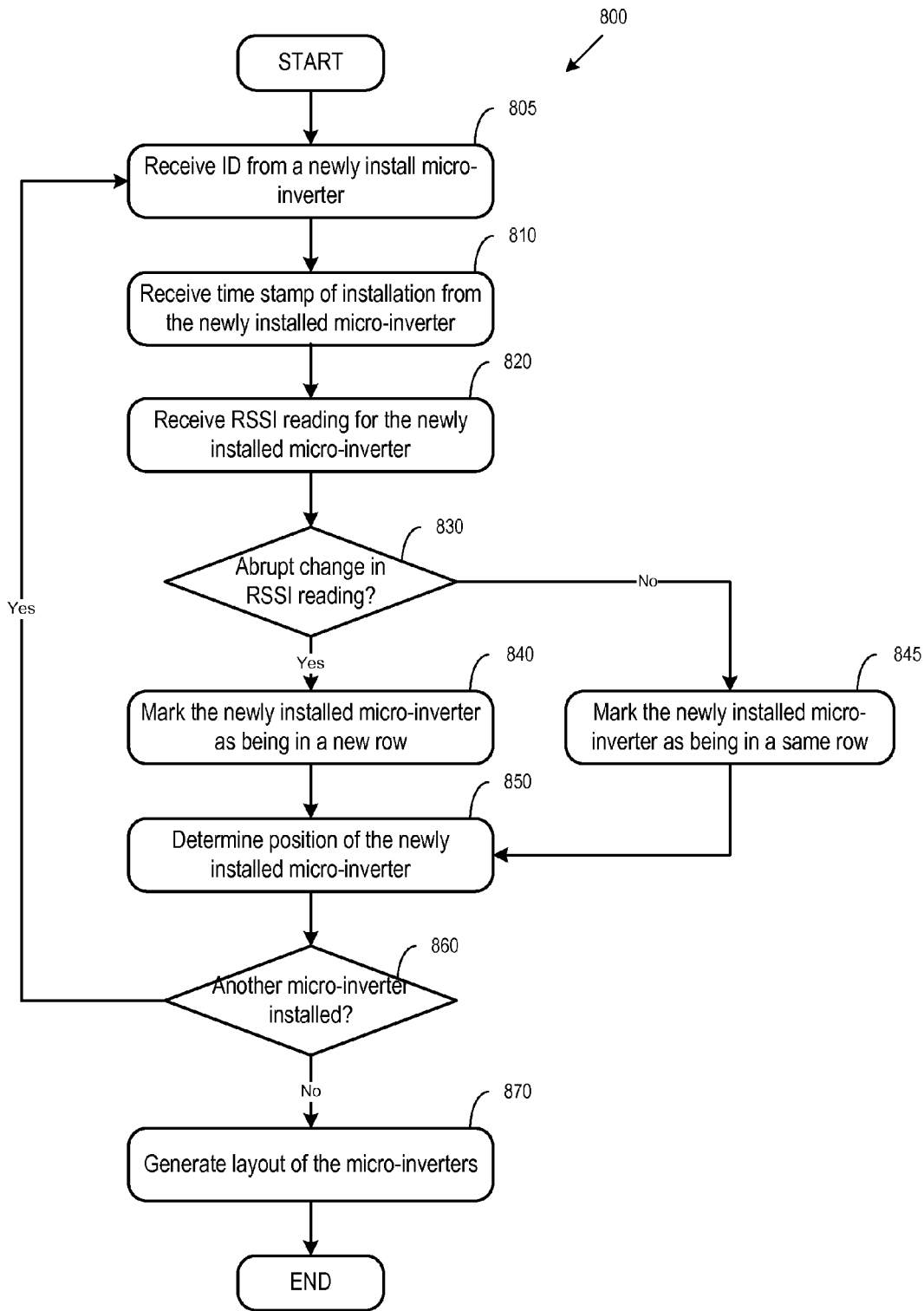
FIG. 8 conceptually illustrates a process that uses installation time stamps from micro-inverters installed according to a particular sequence to determine positions of micro-inverters in an array.

Hence, an installation layout can be produced by first sorting the micro-inverters according to their installation time stamps and then by dividing the sorted micro-inverters into rows according to the detected row changes. FIG. 8 conceptually illustrates a process 800 that uses installation time stamps from micro-inverters installed according to a particular sequence to determine positions of micro-inverters in an array. In some embodiments, timestamps and other information about the micro-inverters in the array are stored at a server (such as the server 120 of FIG. 1), and the process 800 is performed by a computing device that is communicatively coupled to the server. In some embodiments, the process 800 is performed by a communications gateway such as 605.

The process 800 starts when a first micro-inverter is installed and activated by the power from the solar panel. The process receives (at 805) an ID from the newly installed and activated micro-inverter. The process also receives (at 810) a time stamp of installation. In some embodiments, the timestamp is received from the newly installed and activated micro-inverter. In some other embodiments, the timestamp is allocated by the process 800 based on a reading of a real-time clock (e.g., by the communications gateway).

Next, the process receives (at 820) an RSSI reading for the newly installed micro-inverter. As mentioned above by reference to FIGS. 6-7, different embodiments use different types of the RSSI readings. In some embodiments, the RSSI reading for the newly installed micro-inverter is based on the signal strength between the newly installed micro-inverter and a reference node (e.g., the communications gateway, an anchor node, or a chosen micro-inverter in the array). In some embodiments, the RSSI readings are based on signal strength between micro-inverters that have consecutive time stamps.

The process next determines (at 830) whether there is an abrupt change in RSSI readings. Some embodiments store each received RSSI reading so it can be used for comparison with the RSSI reading of the next micro-inverter. The process compares the stored RSSI reading with the newly received RSSI reading to determine whether there is an abrupt change (i.e., sudden drop off or sudden surge in the RSSI reading.) If there is an abrupt change in RSSI reading, the process proceeds to 840 to mark the newly installed micro-inverter as being in a new row. On the other hand, if there is no abrupt change in RSSI reading, the process proceeds to 845 and mark the newly installed micro-inverter as being in a same row as the previously installed micro-inverter.

After marking the newly installed micro-inverter as either being in a new row or in the same row, the process determines (at 850) position of the newly installed micro-inverter. In some embodiments, this determination is based on a configuration of solar panels that is pre-specified by the manufacturer. Such a configuration in some embodiments is enforced by railings and other hardware components that require solar panels and micro-inverters be installed at certain pre-determined slots. The identifiers, the time stamps, and the RSSI readings of the micro-inverters provide the necessary information to determine which micro-inverter is being installed at which slot. The pre-specified installation configuration in turn specifies the exact dimension and spacing, and hence the exact positions of the installed micro-inverters.

The process next determines (at 860) whether there is another micro-inverter being installed. In some embodiments, this determination is made by the installer, who issues a command (e.g., by pressing a button) to the communications gateway to terminate the micro-inverter installation process. In some embodiments, this determination is made based on whether there are additional identifiers and time stamps being received within a window of time. In some embodiments, this determination is made based on a manufacturer-identified configuration, which specifies the number of micro-inverters that can be installed. If there is another micro-inverter that has been installed and activated, the process returns to 805 to receive ID and time stamps from the newly installed micro-inverter. If there is no more micro-inverter being installed (i.e., the installation process has been terminated), the process proceeds to 870 to generate the layout of the micro-inverters based on the position of the micro-inverters determined at 850. After generating the layout, the process 800 ends.

III. Using RF Signal Strengths

The method of generating an installation layout based on time stamps as described in Section II above relies on the array of micro-inverters being regular and uniform. However, in some embodiments, chimneys or other items may be protruding on the roof to cause the array to become irregular. The resultant layout created by the above time stamp based method would not necessarily be able to show a gap caused by the protruding object. Furthermore, the timestamp approach requires that the installation of the micro-inverters adhere to a particular sequence that may not be the fastest (e.g., this approach would not allow faster installation by multiple installers working in different parts of the solar array/roof at the same time.) Some embodiments therefore, do not rely on a particular sequence of installation. In some of these embodiments, RF signal strengths (as indicated by RSSI or LQI) between micro-inverters are used to determine the position of micro-inverters.

In some embodiments, in order to establish the map or the installation layout of the micro-inverters there are two steps that need to be achieved. The initial is the relative positioning and the second is the actual positioning. To determine relative positioning of micro-inverters, some embodiments utilize Receiver Signal Strength Indicator (RSSI). RSSI is information that is available in most wireless solutions/protocols such as ZigBee. The RSSI value is the relative received signal strength in a wireless environment. RSSI provides information regarding the power level being received by the transceiver. Greater or higher the RSSI value (or less negative in some devices) indicates the stronger the signal. Some embodiments use the RSSI values as indicators of distances between the receiver of the signal (e.g., a micro-inverter) and the transmitter of the signal (e.g., the communication gateway or another micro-inverter).

In some embodiments, the relative positioning is determined by using Link Quality Indicator or Index (LQI) to determine connectivity between neighboring nodes. The LQI can be derived from the RSSI value and can provide additional level of understanding in terms of relative distance between micro-inverters. The LQI value represents the reliability of receiving a data packet intact. The LQI measurement is sometimes based on the chip error rate of the current packet being received, so that it provides information specific to neighboring devices relaying the current packet to the local device.

Figure 9:
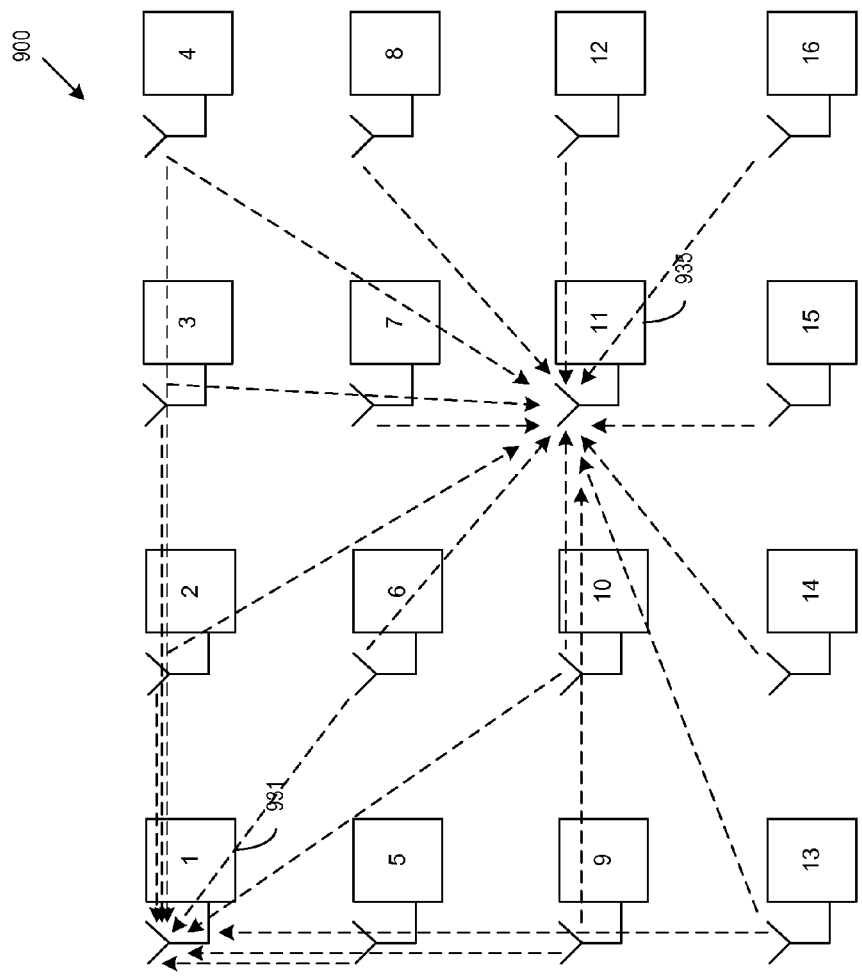
FIG. 9 illustrates an array of micro-inverters in which Radio Frequency (RF) signal strengths between the micro-inverters are used to determine relative positions of micro-inverters in the array.
Figure 9:
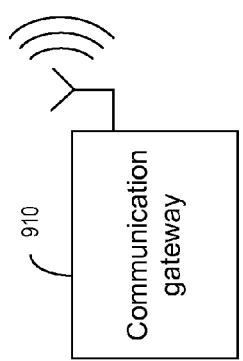

FIG. 9 illustrates an array 900 of micro-inverters in which RF signal strengths (either RSSI or LQI) between the micro-inverters are used to determine relative positions of micro-inverters in the array. The array 900 of micro-inverters is also a mesh network in which every micro-inverter in the array is communicatively coupled with all other micro-inverters in the array. The figure illustrates 16 micro-inverters in the mesh network 900 labeled from '1' to '16', including micro-inverters 931 (micro-inverter labeled '1') and 935 (micro-inverter labeled '11'). The micro-inverters are in a RF communications system with a communication gateway 910. Though only communications to micro-inverters 931 and 935 are illustrated, one of ordinary skill would understand that RF communication could occur between any two micro-inverters in the array 900.

Figure 10:
FIG. 10 illustrates a matrix that details the signal strengths between the micro-inverters in a mesh.

The micro-inverters in the mesh network 900 reports their relative position information to the communication gateway 910. In some embodiments, this relative positioning information is based on the RSSI readings detected by the micro-inverters. For example, the micro-inverter 931 (labeled '1') reports the RSSI readings that it is able to detect and register, (i.e., micro-inverters in the mesh 900 that are sufficiently close to the micro-inverter 931). The micro-inverter 935 (labeled '11') likewise reports RSSI readings that it is able to detect and register. The micro-inverters send the detected signal strengths to the communications gateway 910 to be recorded. Based on the received RSSI readings, some embodiments construct a matrix that details the signal strengths detected at each micro-inverter. Such a matrix is also indicative of the relative positions between the micro-inverters. FIG. 10 illustrates such a matrix 1000 that details the signal strengths between the micro-inverters in the mesh 900.

The matrix 1000 includes 16 columns that correspond to the 16 micro-inverters in the array 900. For example, the column 1001 correspond to the micro-inverter 931 (labeled '1') and the column 1011 correspond to the micro-inverter 935 (labeled '11'). The matrix 1000 also includes 16 rows, corresponding to RSSI readings based on strength of signals (or RF link) received from the 16 micro-inverters in the array 900. For example, the matrix 1000 shows that micro-inverter 931 (the micro-inverter labeled '1') is able to detect signals from micro-inverters labeled '2', '3', '4', '5', '6', '9', '10', and '13'. These micro-inverters, as shown in FIG. 9, are micro-inverters that sufficiently close to the micro-inverter 931. Other micro-inverters (micro-inverters '7', '8', '11', '12', '14', '15', and '16') do not have appreciable signal strengths at micro-inverter 931, as these are micro-inverters that are too far from the micro-inverter 931. Likewise the matrix 1000 shows that the micro-inverter 935 (labeled '11') is not able detect signals at appreciable strengths from micro-inverters labeled '1' and '5'.

Some embodiments use the link strengths themselves as indications of relative positions between the micro-inverters, because micro-inverters that are positioned closer to each other will have a stronger RSSI reading, while those that are positioned farther away wall have a weaker RSSI reading. For example, a system or algorithm processing the matrix 1000 would determine that micro-inverter labeled '2' is closer to the micro-inverter 931 (labeled '1') than the micro-inverter labeled '4', since the micro-inverter labeled '2' has RSSI reading of 5 at the micro-inverter 931, while the micro-inverter '4' has RSSI reading of only 1. Likewise, the same system processing the matrix 1000 would also determine that the micro-inverter labeled '10' is closer to the micro-inverter 935 (labeled '11') with greater link strength (5) than the micro-inverter labeled '13' with weaker link strength (1). The list of signal strengths in the column 1001 thus provides the relative position information for the micro-inverter 931, while the list of signal strengths in the column 1011 provides the relative position information for the micro-inverter 935. Each column of the matrix 1000 is effectively a local map for a micro-inverter in the mesh 900.

Figure 11:
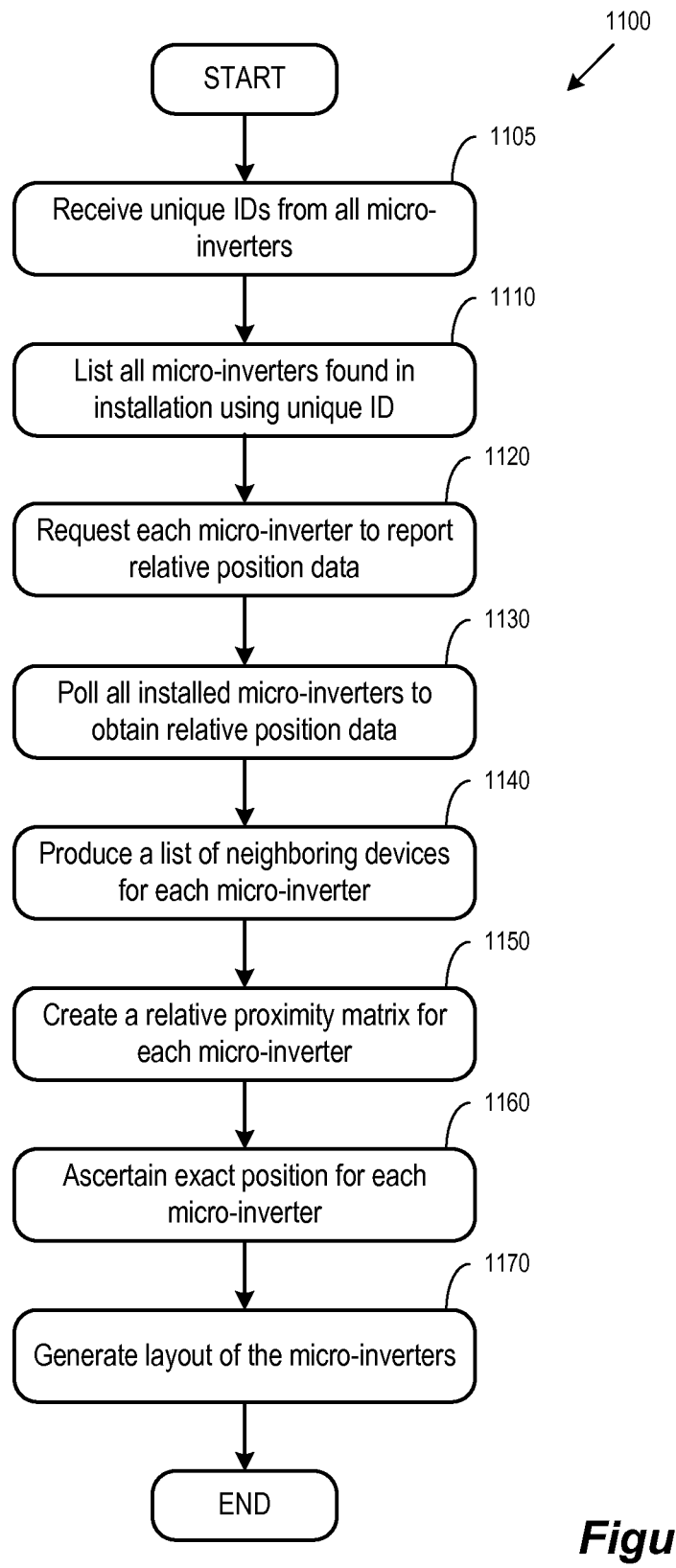
FIG. 11 conceptually illustrates a process for automatically generating installation layout using relative position information of micro-inverters in a mesh.

FIG. 11 conceptually illustrates a process 1100 for automatically generating installation layout using relative position information of micro-inverters in a mesh such as 900. In some embodiments, this process is performed by an installation coordinator (e.g., the communications gateway 110) and starts after all micro-inverters and solar panels have been installed. In some embodiments, the installer initiates the process 1100 by issuing a command to the communications gateway (e.g., by pressing a button on the communications gateway or other devices in the system) to start collecting position information. In some other embodiments, position information about the micro-inverters in the array are stored at a server (such as the server 120 of FIG. 1), and the process 1100 is performed by a computing device that is communicatively coupled to the server.

The process receives (at 1105) identifiers (ID) from the micro-inverters that uniquely identify each micro-inverter in the mesh. Some embodiments receive the IDs after the mesh of micro-inverters have been completely installed. In some other embodiments, a micro-inverter reports its ID to the installation coordinator as soon as it is installed. In some other embodiments, the installation coordinator receives these IDs before any of the micro-inverters are actually installed. This can be done if the micro-inverters in an installation package are pre-registered before they are physically installed.

Next, the process lists (at 1110) all the micro-inverters found in the installation using the unique IDs. The process next requests (at 1120) each micro-inverter to report a set of relative position data. In some embodiments, this entails requesting each micro-inverter to undertake a map of RSSI or LQI as discussed above by reference to FIGS. 9-10. Namely, each micro-inverter is requested to capture information that is indicative of the micro-inverter's position relative to its neighbors, such as RSSI readings and/or LQI readings from neighboring micro-inverters.

The process next polls (at 1130) every device it can see and obtain values for relative position data (e.g., RSSI, LQI, etc.). Based on the result of this polling, the process produces (at 1140) a list of neighboring devices for each micro-inverter. The list of neighboring devices for a micro-inverter lists devices in close proximity and as well as devices that are further away from the micro-inverter.

The process then creates (at 1150) a matrix for each micro-inverter based on the micro-inverter's list of neighboring devices. The matrix in some embodiments covers the entire array of micro-inverters. An example of such matrix is discussed above by reference to FIG. 10. In some other embodiments, the matrix captures only the nearest neighbors. This representation defines the relative proximity of micro-inverters from one to another. It gives an indication of which micro-inverter is close to one another. Some embodiments produce a list for each micro-inverter that list from the nearest to the furthest micro-inverters.

The process then ascertains (at 1160) exact or precise locations of the micro-inverters, such as determining which micro-inverters are on the edge and which order these devices are in the center. Different embodiments use different techniques to ascertain such exact and precise positions. In some embodiments, the RSSI/LQI level data between micro-inverters in the mesh are combined with other reference information to produce a more accurate representation of the layout. Examples of such reference information include: installation time stamps provided by individual micro-inverters (as discussed above in Section II), RSSI/LQI readings with the communications gateway, known positional requirements imposed by railings and other hardware components, etc. In some embodiments, such reference information is provided by anchor nodes with known positions. Anchor nodes will be further described below in Section IV.

Based on the relative and exact positional information gathered, the process then generates (at 1170) an installation layout of the micro-inverters after generating the installation layout, the process ends.

IV. Using Anchor Nodes

In some embodiments, anchor nodes with known positions are used to determine the positions of micro-inverters in the array and for generating the map of the installed devices. As mentioned above, RSSI and LQI information between micro-inverters provides only relative position information. To ascertain exact positions of the micro-inverters, some embodiments use reference information provided by anchor nodes.

Anchor nodes are present in some embodiments to provide additional information for ascertaining the position of the installed micro-inverters. In some embodiments, two or more anchor nodes are placed in positions around the array micro-inverters. The physical positions of the anchor nodes serve as reference in the determination of the position of the micro-inverters. Like the micro-inverters themselves, anchor nodes are also equipped with RF circuitry for transmitting position information about the micro-inverters to the communication gateway and the server. The same RF circuitry in some embodiments is also used for determining the positions of the micro-inverters.

Figure 12A:
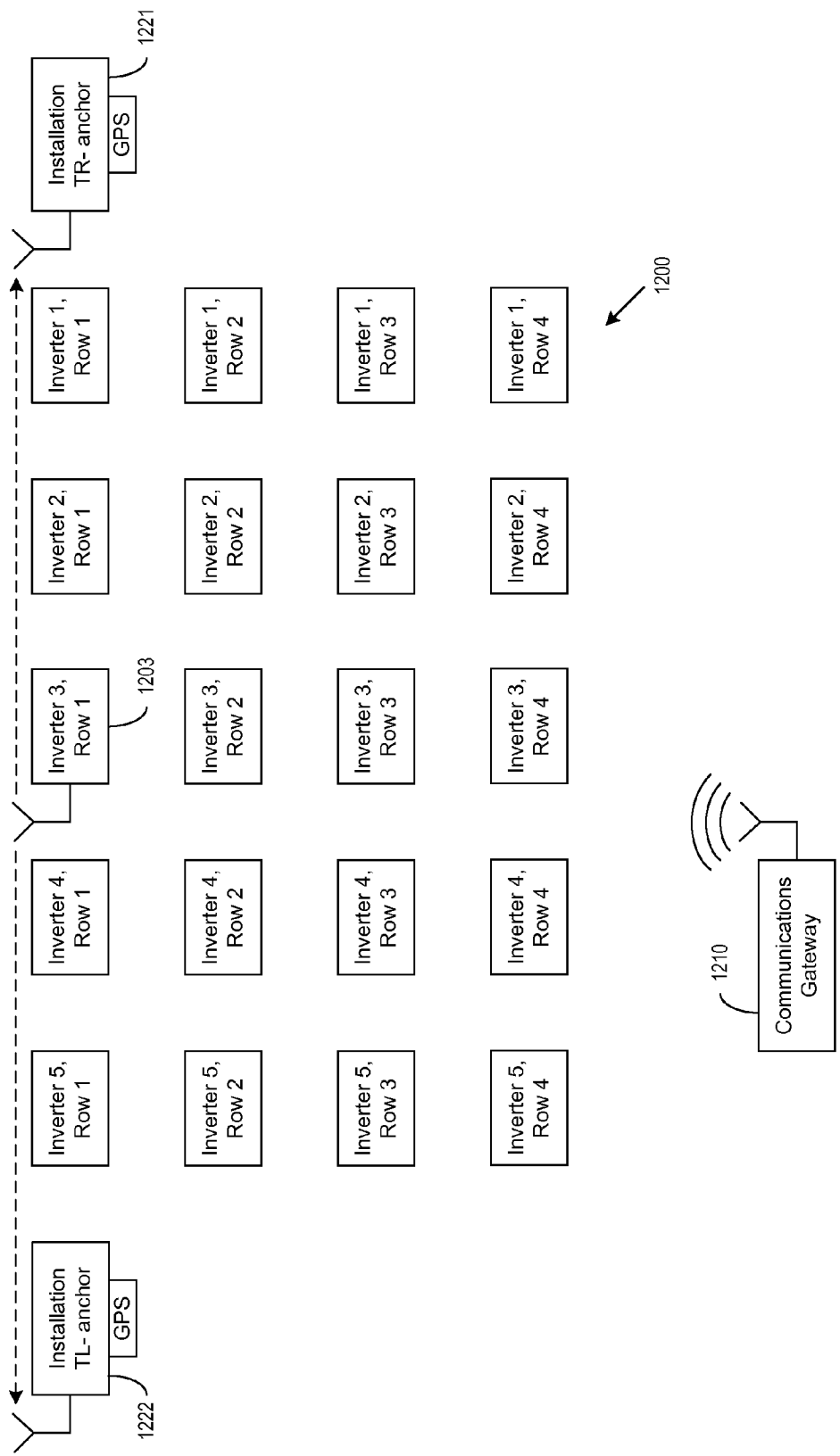
FIG. 12a illustrates using a pair of anchor nodes for ascertaining positions of micro-inverters in an array.

FIG. 12a illustrates using a pair of anchor nodes for ascertaining positions of micro-inverters in an array 1200. Like the micro-inverters in the array 900 of FIG. 9, the micro-inverters in the array 1200 are in a communicative mesh in which every micro-inverter can communicate with other micro-inverters in the mesh. Each micro-inverter records a set of RSSI/LQI readings based on the RF signal strengths with other micro-inverters in the mesh. Each of the micro-inverters reports the RSSI/LQI readings to a communications gateway 1210, which creates a matrix detailing relative positions between the micro-inverters.

The figure also illustrates two installation anchor nodes 1221 and 1222. The anchor nodes 1221 and 1222 have physical positions that are known to the computing device generating the installation layout. As illustrated, the anchor nodes 1221 and 1222 are placed at known locations that are horizontally aligned with the first row of the micro-inverters in the array 1200. Specifically, the anchor node 1221 is placed to right of the first micro-inverter of the first row, while the anchor node 1222 is placed to the left of the last micro-inverter of the first row. In this instance, the exact location of each anchor node is made known by placing the anchor nodes in known positions that are aligned to the micro-inverters in the array. Instead of relying on placing the anchor nodes in known positions, some embodiments use anchor nodes that are equipped with GPS receivers that can provide the exact location of the anchor nodes.

The first row of micro-inverters includes a micro-inverter 1203, which is illustrated as wirelessly communicating with the anchor nodes 1221 and 1222. The relative position of the micro-inverter 1203 is already determined by a process similar to what was described above in Section III. The RSSI/LQI readings for signal strengths between the two anchor nodes and the micro-inverter 1203 is recorded and transmitted to the communications gateway 1210 by either the micro-inverter 1203 or by the two anchor nodes. Though not illustrated, RSSI/LQI readings for signal strengths between the two anchor nodes and each of the micro-inverters in the array 1200 are similarly determined and relayed to the communications gateway 1210. In conjunction with the relative position information already determined earlier, these anchor node based RSSI/LQI readings serve as additional pieces of information that can be used for determining the exact locations of the micro-inverters.

Figure 12B:
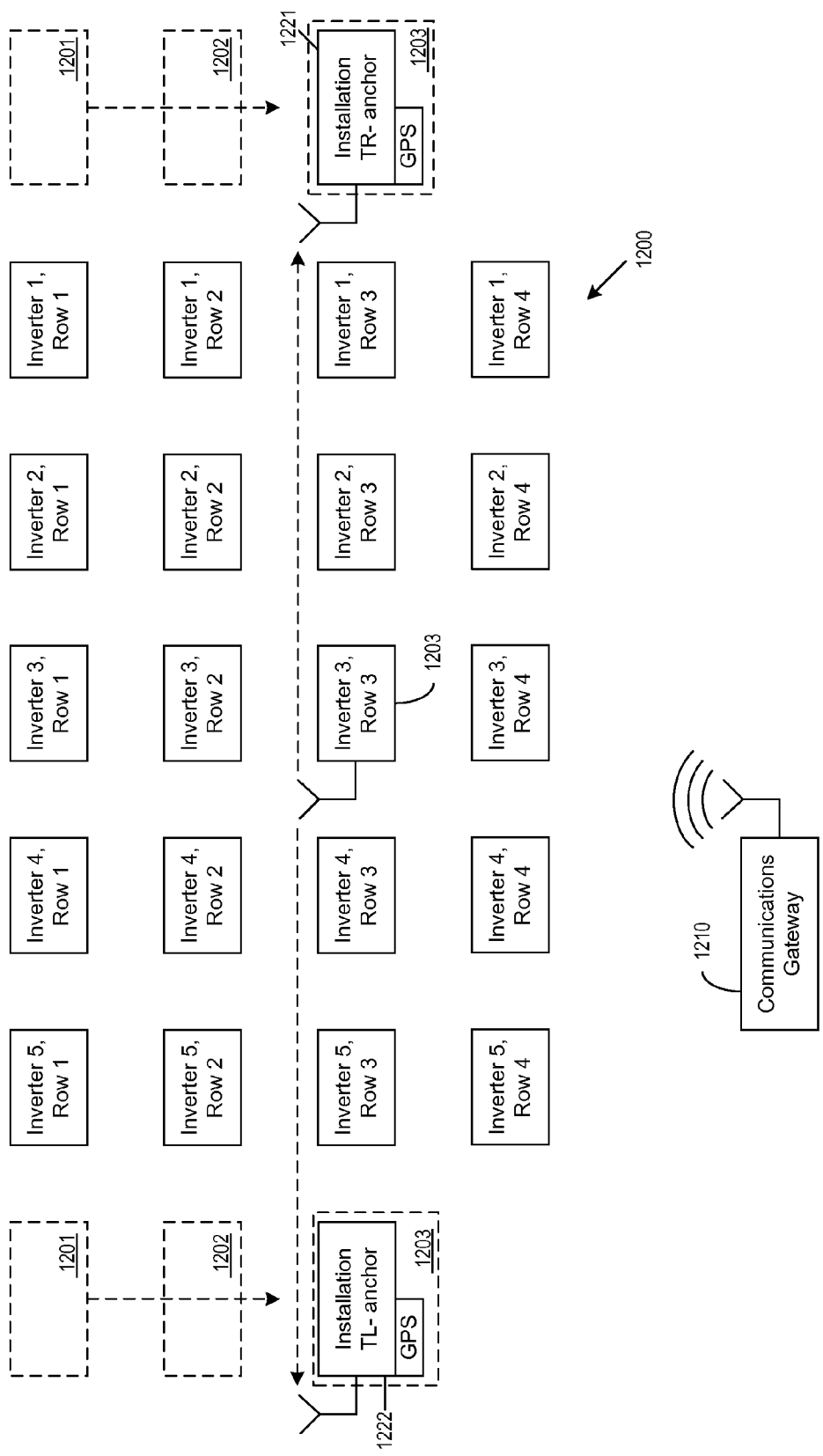
FIG. 12b illustrates the moving of anchor nodes in order to obtain additional RSSI/LQI readings.

In order to obtain anchor node RSSI/LQI readings that are even more accurate, some embodiments move the anchor node alongside the array of micro-inverters to obtain additional sets of RSSI readings with the two anchor nodes at different positions. FIG. 12b illustrates the moving of anchor nodes in order to obtain additional RSSI/LQI readings. As illustrated, the anchor nodes 1221 and 1222 are placed at successive slots 1201-1203 alongside the array 1200. These slots 1201-1203 are chosen to be horizontally aligned with the rows of the array 1200. The anchors 1221 and 1222 were initially at slot 1201 aligned with the first row of micro-inverters (as illustrated in FIG. 12a), then onto the slots aligned with the second, third and fourth row of micro-inverters. By moving the anchor nodes into different slots that are aligned with different rows of the micro-inverters, the system is able to provide the anchor nodes RSSI/LQI readings that accurately show which micro-inverter is in which row.

In some embodiments, the anchor nodes 1221 and 1222 as shown in FIGS. 12a and 12b are not micro-inverters themselves. They are specialized installation devices that are not part of the array of micro-inverter being installed. These installation devices can be re-used for other installation of solar panels at other sites and can be equipped with components that are not in micro-inverters. The anchor nodes could be used as installation devices or could be permanent features of the installation incorporating other functionality to justify their permanence. For example, the anchor nodes in some embodiments are equipped with additional instruments such as irradiance sensors or temperature sensors. In some embodiments, micro-inverters are not equipped with GPS chips (e.g., for cost reasons) while the installation anchor nodes are.

An anchor node with GPS capability can ascertain its own position exactly. With its own GPS determined position as referential basis, the anchor nodes then determine the positions of installed micro-inverters in the array. The anchor nodes will send all the position information at a specific time stamp to the communications gateway. The position information gathered by the communications gateway will be used to create matrix of the positions of the micro-inverters.

Some embodiments use "Differential GPS" that involve the use of two or more GPS receivers. In some of these embodiments, one GPS receiver monitors variations in the GPS signal and communicates those variations to the other GPS receiver. The second receiver can then correct its calculations for better accuracy. In some embodiments, this second GPS receiver is integrated into the same anchor node along with the first GPS receiver. Alternatively, one of the anchor nodes could be used as a differential receiver to calculate the variations. The combination of GPS data and the RSSI/LQI level data are used to provide a more accurate representation of the layout.

Some embodiments do not use specialized installation anchor nodes. In some of these embodiments, some of micro-inverters in the array, once installed, are configured by the energy harvesting system to act as anchor nodes. The anchor node micro-inverter, though identical to other micro-inverters in the array, behave like the installation anchor nodes 1221 and 1222 and record and report signal strengths with other micro-inverters to the communications gateway 1210. In some of these embodiments, micro-inverters at the corner of the array are used as anchor nodes.

Figure 13A:
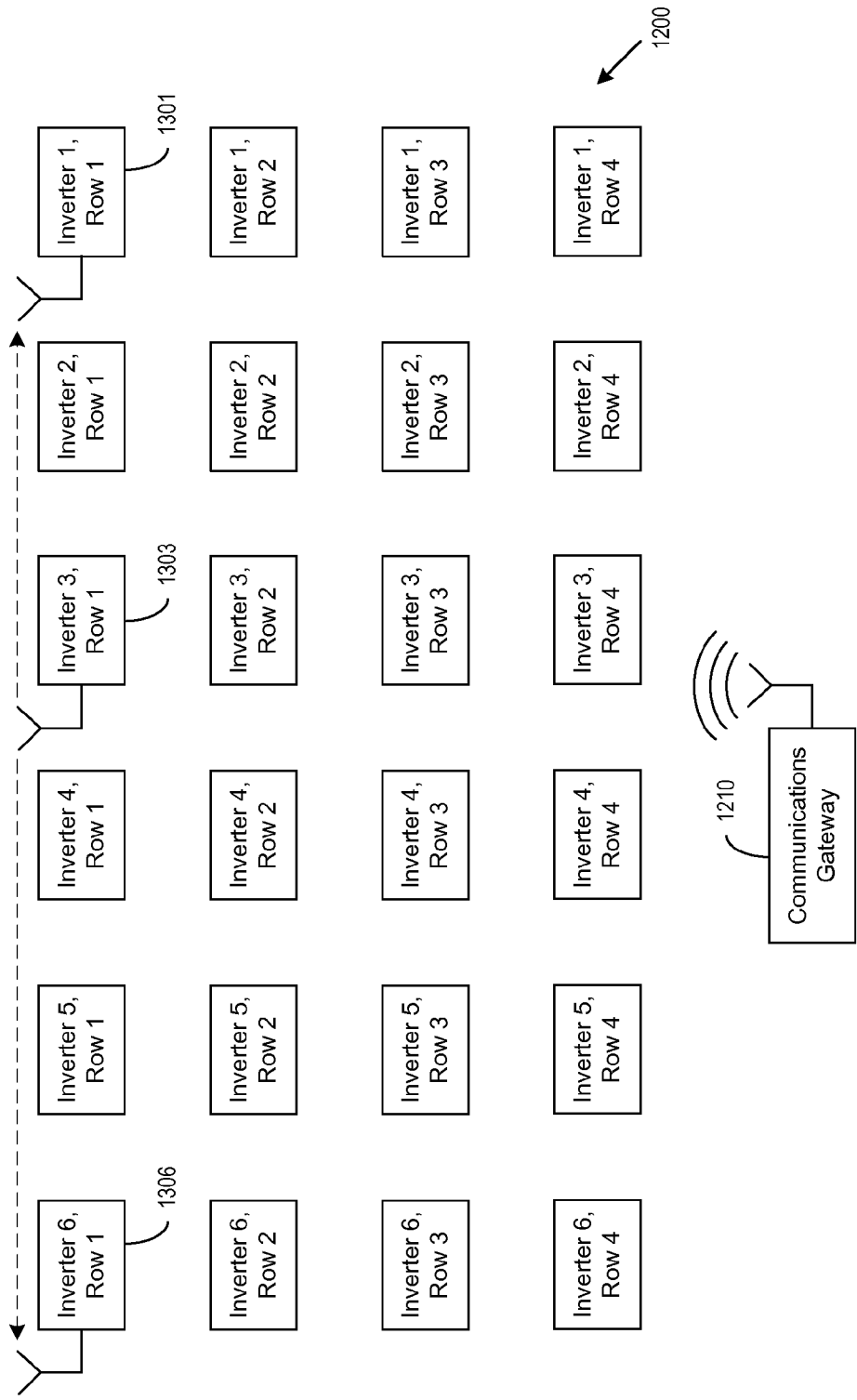
FIG. 13a illustrates using a pair of micro-inverters in an array as anchor nodes for ascertaining positions of micro-inverters.

FIG. 13a illustrates using a pair of micro-inverters in the array 1200 as anchor nodes for ascertaining positions of micro-inverters. The figure illustrates micro-inverters 1301 and 1306 being used as anchor nodes. The anchor node micro-inverter 1301 is at the top right corner of the array 1200. The anchor node micro-inverter 1302 is at the top left corner of the array 1200.

In some embodiments, a micro-inverter is selected as the anchor node after the communications gateway has determined it to be a corner anchor node. In some embodiments, the technique described in Section II above can be used to determine whether a micro-inverter is at the corner of the array. For example, the micro-inverter with the earliest time stamp is recognized as the first micro-inverter in the top right corner, while the last micro-inverter to still be in the same row (i.e., before the abrupt change in RSSI) is recognized as the micro-inverter in the top left corner, and the exact positions of the anchor node micro-inverters can be ascertained according to spacing requirements imposed by railings and other hardware components for the solar panel installation. In some other embodiments, each micro-inverter is equipped with switches, including a switch that can be switched on by the installer to configure the micro-inverter as an anchor node.

Figure 13B:
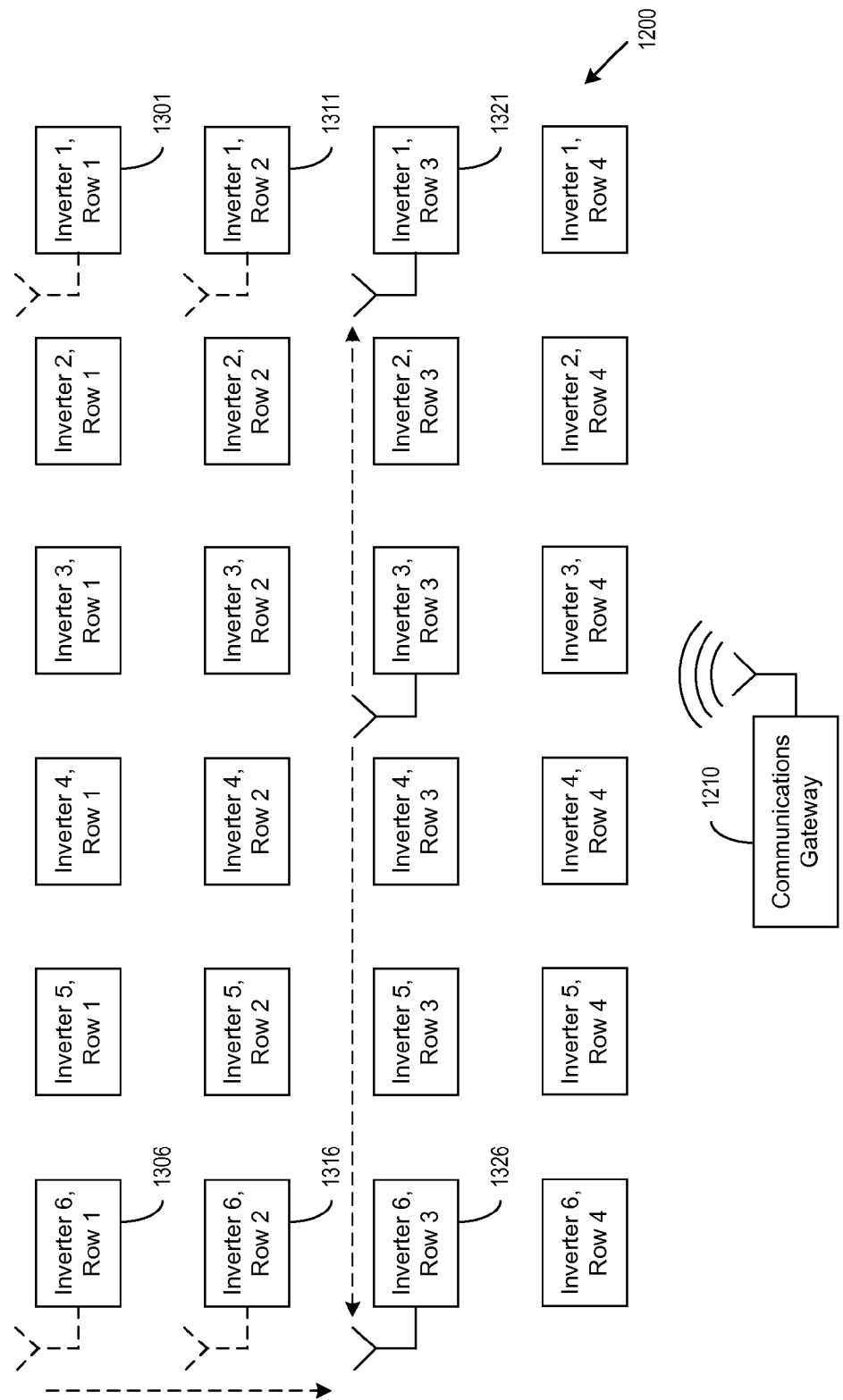
FIG. 13b illustrates an installation process in which different micro-inverters take turns being anchor nodes.

Similar to the moving anchor nodes of FIG. 12b, some embodiments assign different micro-inverters in the array to take turns being anchor nodes, especially micro-inverters along the edges of the array of micro-inverters. FIG. 13b illustrates an installation process in which different micro-inverters take turns being anchor nodes. The figure illustrates the array 1210, which includes micro-inverters 1301, 1306, 1311, 1316, 1321, and 1326. The micro-inverters 1301, 1311, and 1321 are the first micro-inverters of the row 1, 2, and 3 respectively, while the micro-inverters 1306, 1316, 1326 are the last micro-inverters of the row 1, 2, and 3 respectively. The micro-inverters 1301 and 1306 are the first to serve as anchor nodes (as already discussed above by reference to FIG. 13a). The micro-inverters 1311 and 1316 serve as anchor nodes next, then the micro-inverters 1321 and 1326. In some embodiments, the communications gateway selects the micro-inverters to become the anchor nodes by commanding the micro-inverters at the two ends of each row to become anchor nodes (or to stop being anchor nodes.) Micro-inverters serving as anchor nodes perform operations that are similar to the dedicated installation anchor nodes 1221 and 1222 as described above by reference to FIGS. 12a-12b.

Different embodiments use different numbers of anchor nodes. FIGS. 12-13 illustrates examples in which two anchor nodes are used in addition to the link strength matrix to determine the exact position of each micro-inverter in the array. Some embodiments use three anchor nodes to triangulate the exact location of micro-inverters in the array. Some embodiments use four or more anchors to attain exact locations of the micro-inverters with higher accuracy.

Figure 14A:
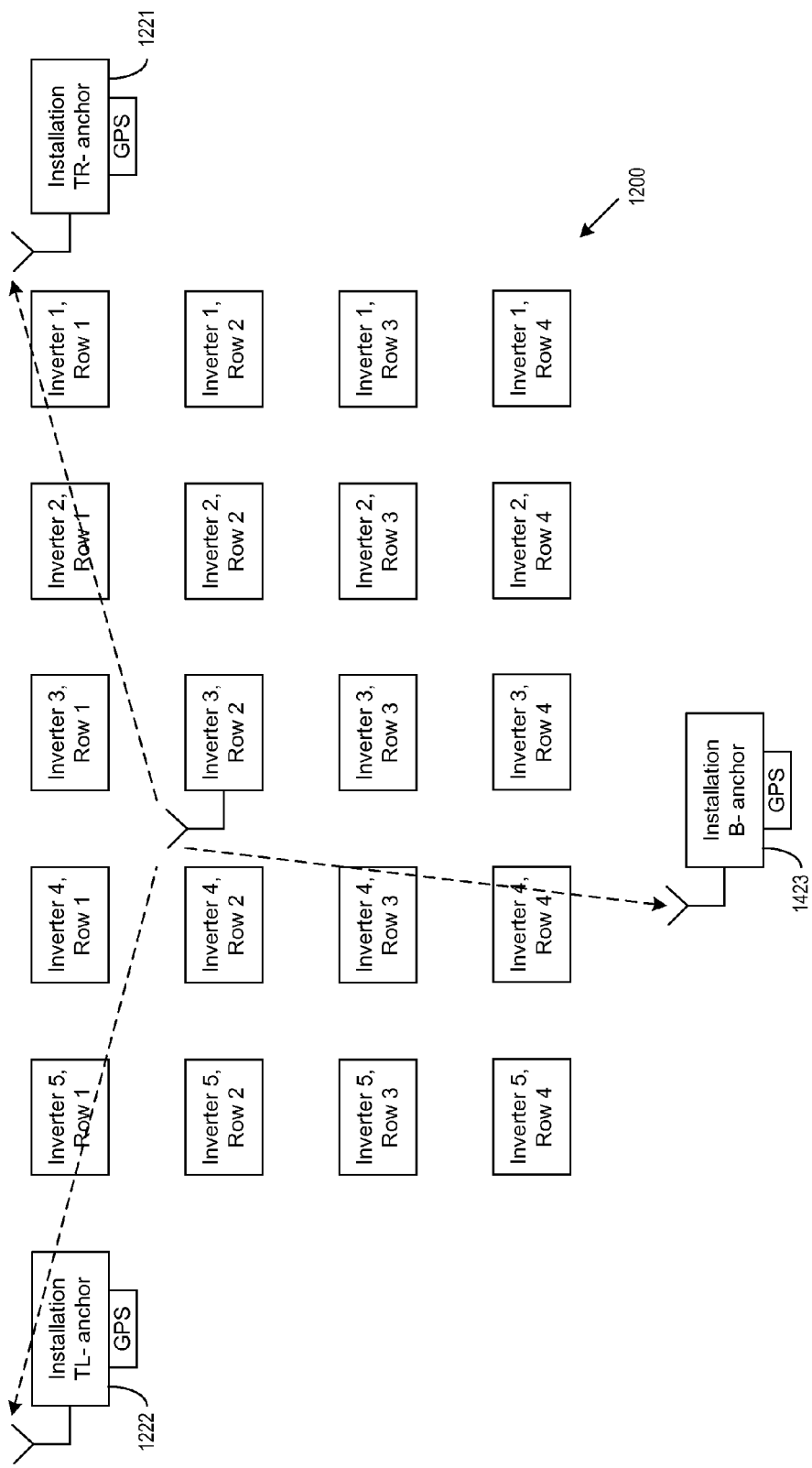
FIG. 14a illustrates using three installation anchor nodes to ascertain the positions of the micro-inverters in an array.
Figure 14B:
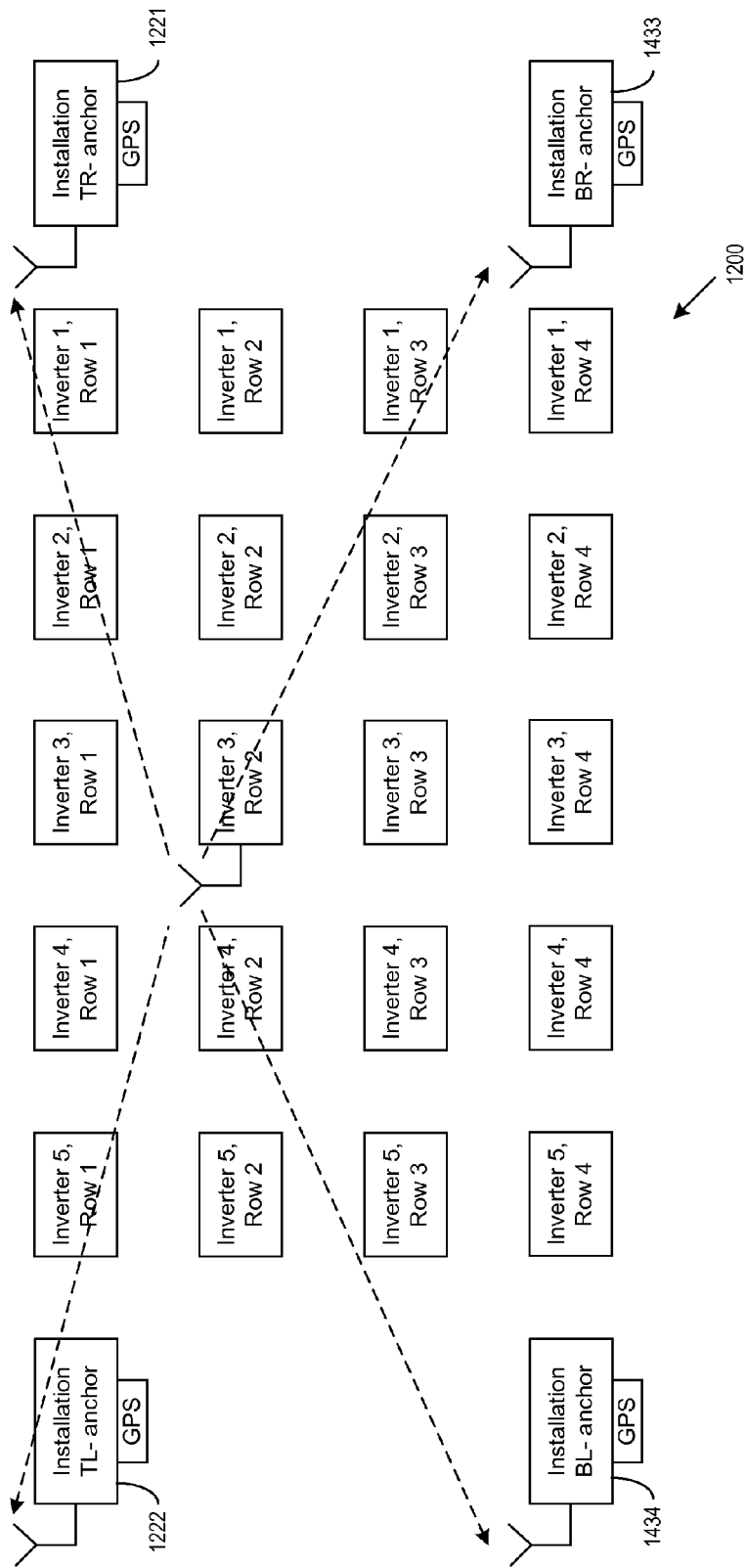
FIG. 14b illustrates using four installation anchor nodes to ascertain positions of micro-inverter for an array.

FIG. 14a illustrates using three installation anchor nodes to ascertain the positions of the micro-inverters in the array 1200. Here, the installation nodes 1221 and 1222 are aided by a third installation node 1423 that is positioned below the array of micro-inverters. Three sets of reference node RSSI/LQI readings are available for analysis for each micro-inverter in the array such as for the micro-inverter 1423. FIG. 14b illustrates using four installation anchor nodes 1221-1222 and 1433-1434 to ascertain positions of the micro-inverters in the array 1200. The four anchor nodes are positioned at the four corners of the array 1200. Having at least three anchor nodes allow using triangulation to determine the exact positions of each micro-inverter.

Figure 15A:
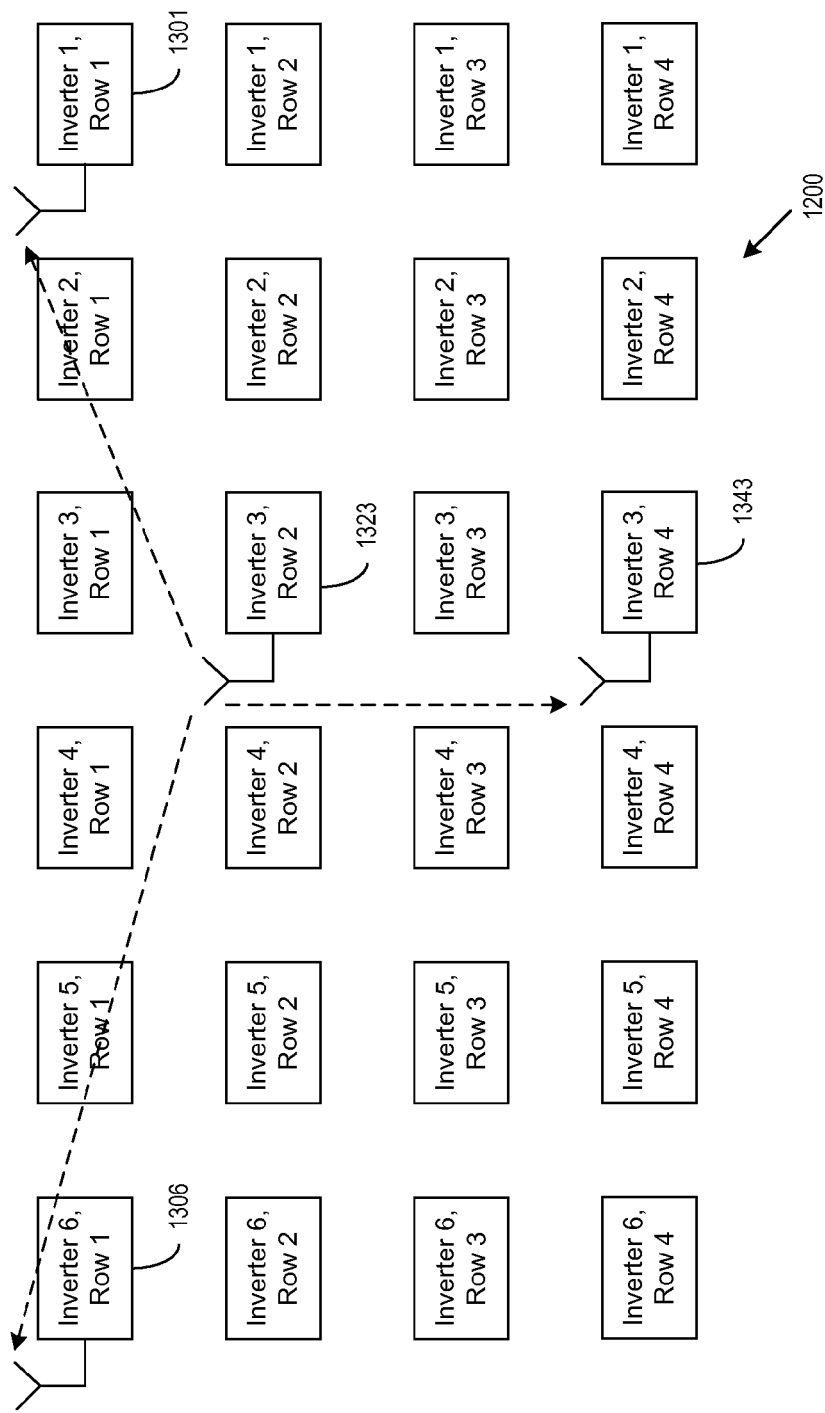
FIG. 15a illustrates using three micro-inverters as anchor nodes to ascertain positions of micro-inverters in an array.
Figure 15B:
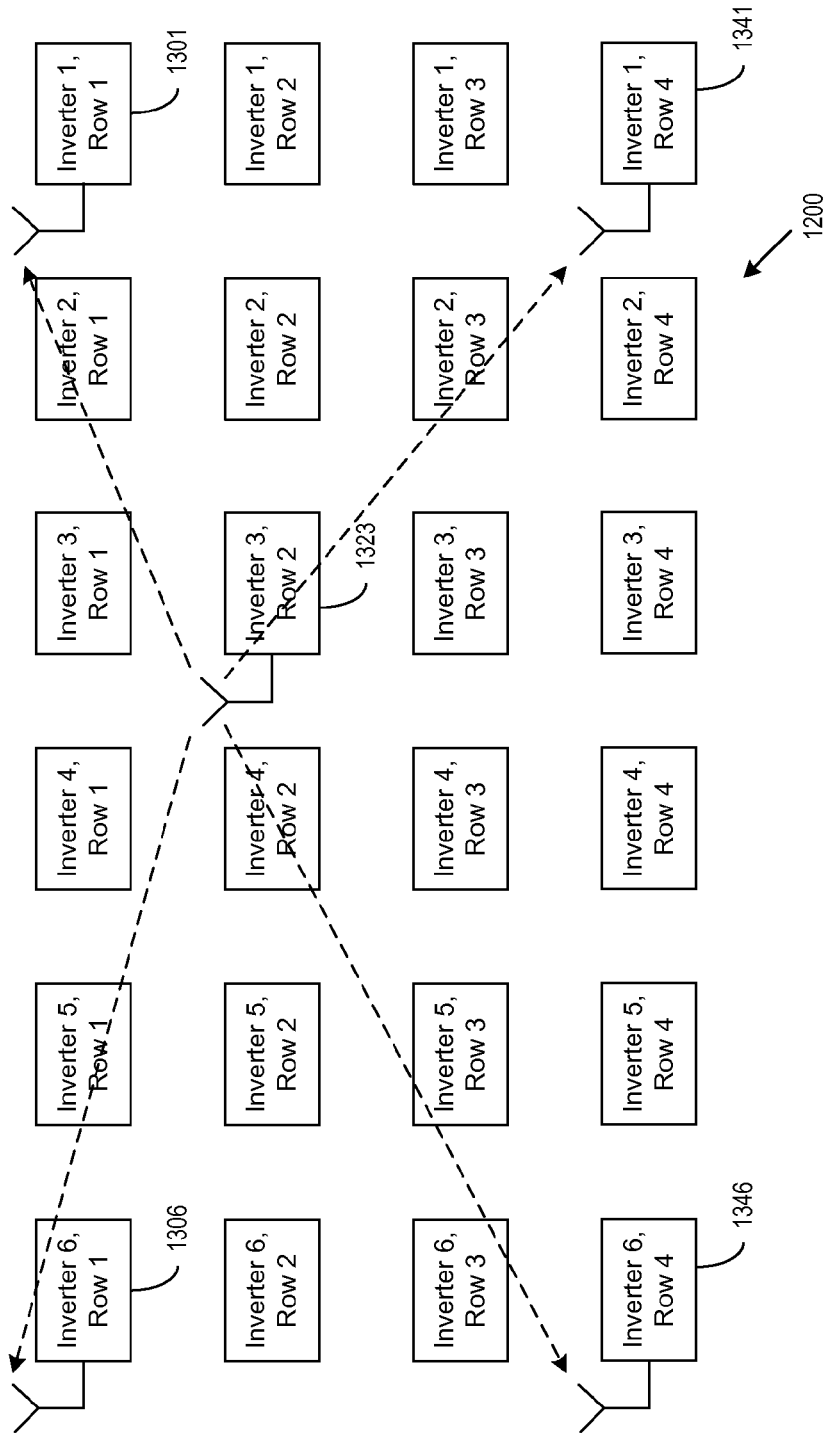
FIG. 15b illustrates using four micro-inverters as anchor nodes to ascertain positions of micro-inverters in an array.

Three or more micro-inverters can likewise be configured to act as anchor nodes. FIG. 15a illustrates using three micro-inverters as anchor nodes. As shown in the figure, micro-inverters at the top right corner (1301), the top left corner (1306), and the bottom (1343) are used for determining the positions of other micro-inverters (such as 1323) in the array 1200. The process of selecting and configuring micro-inverters as anchor nodes are similar to those discussed above by reference to FIGS. 13a and 13b. FIG. 15b illustrates using four micro-inverters as anchor nodes. In this instance, the anchor node micro-inverters are at the four corners of the array 1200.

Different embodiments triangulate based on different information from the anchor nodes. Some embodiments use link strengths between the micro-inverters and the anchor nodes as discussed above by reference to FIGS. 12-15. Some embodiments use signal time of arrival or different in time of arrival as basis of triangulation. Some embodiments use angles of incidence of signals from micro-inverters to anchors as basis of the triangulation. These techniques establish the location of the respective micro-inverters by determining the exact distances between the micro-inverters and the reference nodes.

Figure 16:
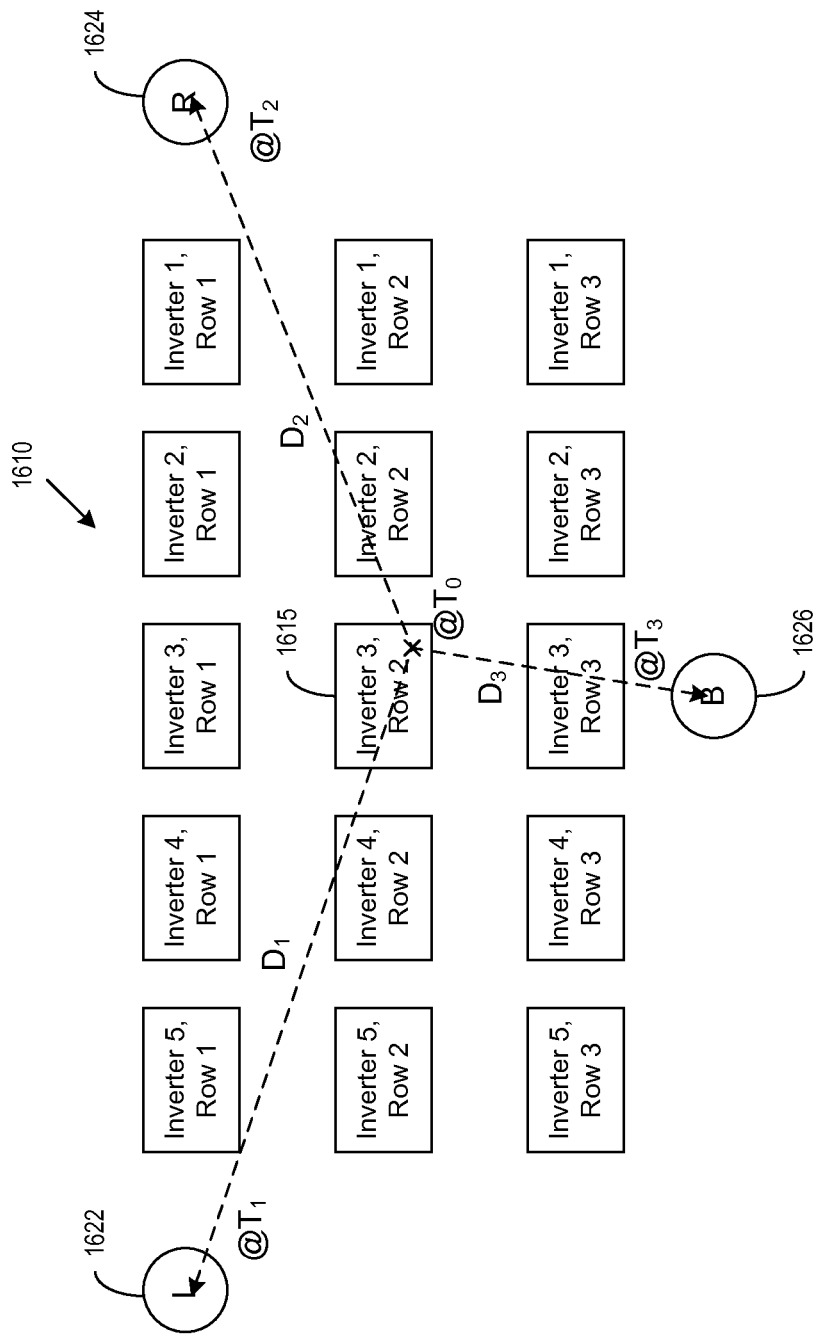
FIG. 16 illustrates using time of arrival at reference anchors to determine exact position of installed micro-inverters.

Time of Arrival (ToA) solution is reliant upon exact measurement of the arrival time of a signal transmitted from a micro-inverter node to several anchor nodes. The signals travel at known velocity (approximately the speed of light), the distance between the anchor nodes and each micro-inverter can be determined from the time of the signal travelling between them. FIG. 16 illustrates using time of arrival at anchors nodes to determine exact position of installed micro-inverters.

As illustrated, micro-inverter 1615 is in a micro-inverter array 1610. The micro-inverter 1615 transmits signals that are received by anchor nodes 1622, 1624, and 1626. The signal is transmitted from the micro-inverter 1615 at time $T_0$ and is received by the anchor node 1622 at time $T_1$, by anchor node 1624 at time $T_2$, and by anchor node 1626 at time $T_3$. The three anchors as well as the micro-inverters already have their time synchronized. The distances between the micro-inverter 1615 and the anchor nodes 1622, 1624, and 1626 can therefore be determined as:

$D_1 = c^*(T_1 - T_0)$, $D_2 = c^*(T_2 - T_0)$, and $D_3 = c^*(T_3 - T_0)$, respectively (c being the speed of light). With these three distances known and the exact positions of the anchor nodes already known, the precise location of the micro-inverter 1615 can be easily ascertained. Though FIG. 16 illustrates three anchor nodes, some embodiments include four or more anchor nodes for determining the positions of the micro-inverters at higher accuracy.

Figure 17:
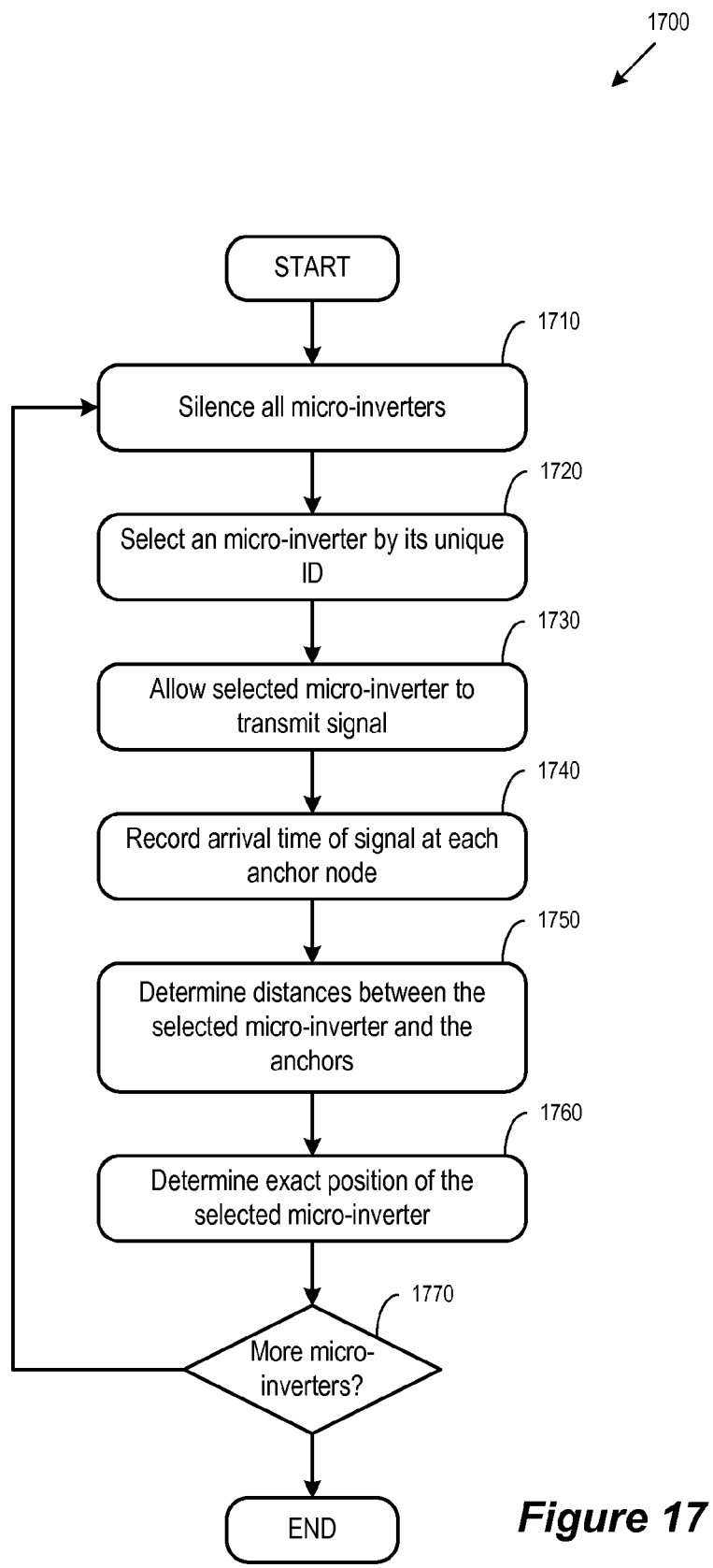
FIG. 17 conceptually illustrates a process that uses time of arrival at reference anchors to determine exact position of an array of installed micro-inverters.

FIG. 17 conceptually illustrates a process 1700 that uses time of arrival at reference anchors to determine exact position of an array of installed micro-inverters. In some embodiments, the process 1700 starts after the micro-inverters have been installed physically and the unique IDs of the micro-inverters are known by the installation coordinator (e.g., the communications gateway). The process silences (at 1710) all micro-inverters such that none of the micro-inverter is transmitting signal. The process then selects (at 1720) a micro-inverter by its unique ID and allows (at 1730) the selected micro-inverter to transmit signal. In the example of FIG. 16, the micro-inverter 1615 is selected by its unique ID to transmit while all other micro-inverters in the array 1610 are silenced.

The process next records (at 1740) the arrival times of the signal at each of the anchor nodes. Based on the arrival time, the process determines (at 1750) the distances between the selected micro-inverter (e.g., 1615) and each of the three the anchor nodes. With the distances known (and the exact positions of the anchor nodes already known), the process determines (at 1760) the exact position of the selected micro-inverter. The process then determines (at 1770) whether there are more micro-inverters for which exact position needs to be determined. If yes, the process returns to 1710. Otherwise, the process 1700 ends.

For some embodiments, the time of arrival technique necessitates exact transmission time and needs all nodes to accurately synchronize with a precise time source. In addition, multipath reflections could add error to the recorded distance and in very small installations this could cause inaccuracies. Instead of requiring exact transmission time, some embodiments use Time difference on Arrival (TDoA) for ascertaining the exact position of micro-inverters. For TDoA method, the transmission with an unknown starting time is received at various receiving nodes (e.g., anchor nodes), with only the receiver's nodes requiring the time synchronization. TDoA implementations are rooted upon a mathematical concept known as hyperbolic lateration. Hyperbolic lateration is a technique based on the measurement of the difference in distance to two or more stations at known locations that broadcast signals at known times. Unlike measurements of absolute distance or angle, measuring the difference in distance results in an infinite number of locations that satisfy the measurement. When these possible locations are plotted, they form a hyperbolic curve. To locate the exact location along that curve, a second measurement is taken to a different pair of stations to produce a second curve, which intersects with the first. When the two are compared, a small number of possible locations are revealed, producing a "fix". To perform TDoA, a minimum of three time-synchronized receiving nodes is needed.

Instead of measuring time of signal arrival, some embodiments measure the angle incidence at which the signals arrive at the anchor node. In some embodiments, array antennas are included within each anchor node to measure the angle of incidence at which signals arrive at the anchor node. An estimate of the location of the target micro-inverter can be made from the intersection of three lines of bearing (LoBs) formed by a radial line to each receiving anchor, as is shown in the FIG. 18. At least two receiving sensors are required for location estimation. Accuracy can be improved with at least three or more anchor nodes.

Figure 18:
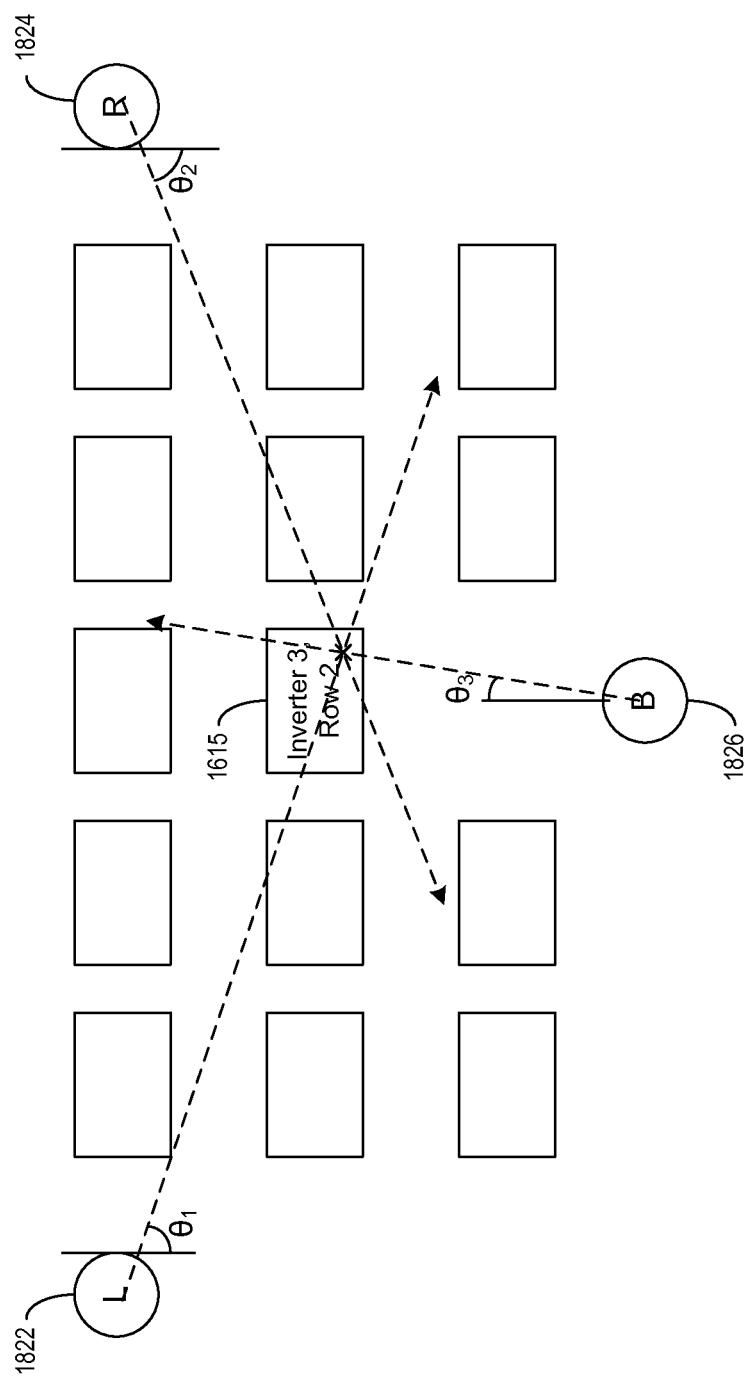
FIG. 18 illustrates the determination of the location of a micro-inverter by using lines of bearing at the anchor nodes.

FIG. 18 illustrates the determination of the location of a micro-inverter by using LoBs at the anchor nodes. Similar to FIG. 16, the micro-inverter 1615 transmits signals that are received by anchor nodes 1822, 1824, and 1826. The anchor nodes 1822, 1824, and 1826 are equipped with highly directional antennas that are capable of determining the angle of incidence of the signal arriving from the micro-inverter 1615. As illustrated, the angle of incidence detected at the anchor node 1822 is $\theta_1$, the angle of incidence detected at the anchor node 1824 is $\theta_2$, and the angle of incidence detected at the anchor node 1822 is $\theta_3$. Based on the determined angle and the known positions of the anchor nodes, some embodiment can compute the exact position of the micro-inverter 1615.

Figure 19:
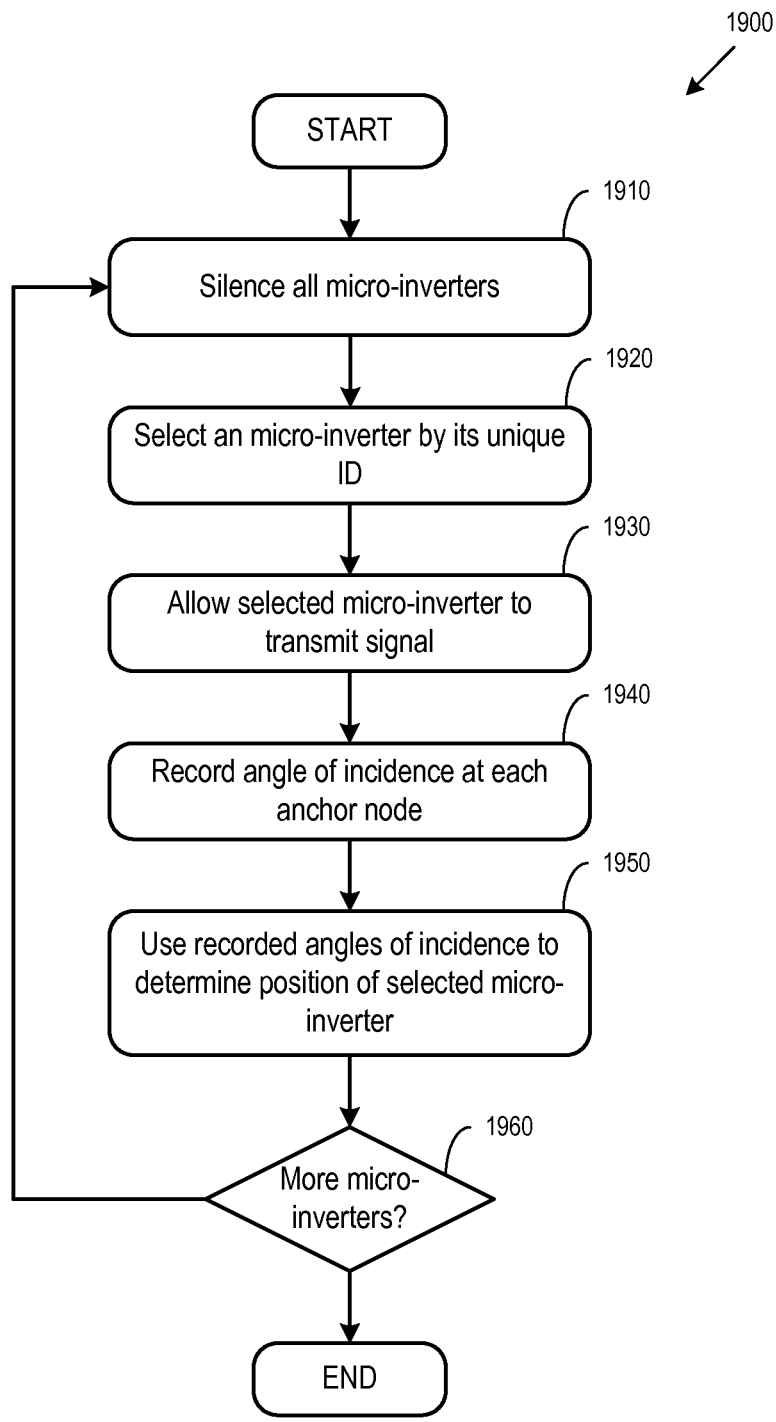
FIG. 19 conceptually illustrates a process for determining the locations of installed micro-inverter in an array by using lines of bearing at anchor nodes.

FIG. 19 conceptually illustrates a process 1900 for determining the locations of installed micro-inverters in an array by using LoBs at anchor nodes. In some embodiments, the process 1900 starts after the micro-inverters have been installed physically and the unique IDs of the micro-inverters are known by the installation coordinator (e.g., the communications gateway). The process silences (at 1910) all micro-inverters such that none of the micro-inverter is transmitting signal. The process then selects (at 1920) a micro-inverter by its unique ID and allows (at 1930) the selected micro-inverter to transmit signal. In the example of FIG. 18, the micro-inverter 1615 is selected by its unique ID to transmit while all other micro-inverters are silenced.

The process next records (at 1940) the angle of incidence of the signal at each of the anchor nodes. Based on the recorded angle, the process uses (at 1950) the recorded angles to determine the position of the selected micro-inverter. For some embodiments, this is involves using the known distances between the anchor nodes and the recorded angles to determine the exact position of the micro-inverter (triangulation). The process then determines (at 1960) whether there are more micro-inverters for which exact position needs to be determined. If yes, the process returns to 1910. Otherwise, the process 1900 ends.

V. Using Hop-Route

In some embodiments, the micro-inverters are in a mesh based communications network. A mesh based communications network, such as ZigBee or wireless M bus, allows individual devices in the energy harvesting system to act as hop/repeater. Data packets are passed or hop from device to device until they reach their desired location. In some protocols this route or hops that a data packet takes can be captured and sent to the end device. In this way the route taken is understood. This also enables micro-inverters to understand the "nearest neighbor" by establishing the number of hops or route the message took before arriving at the micro-inverter.

Figure 20:
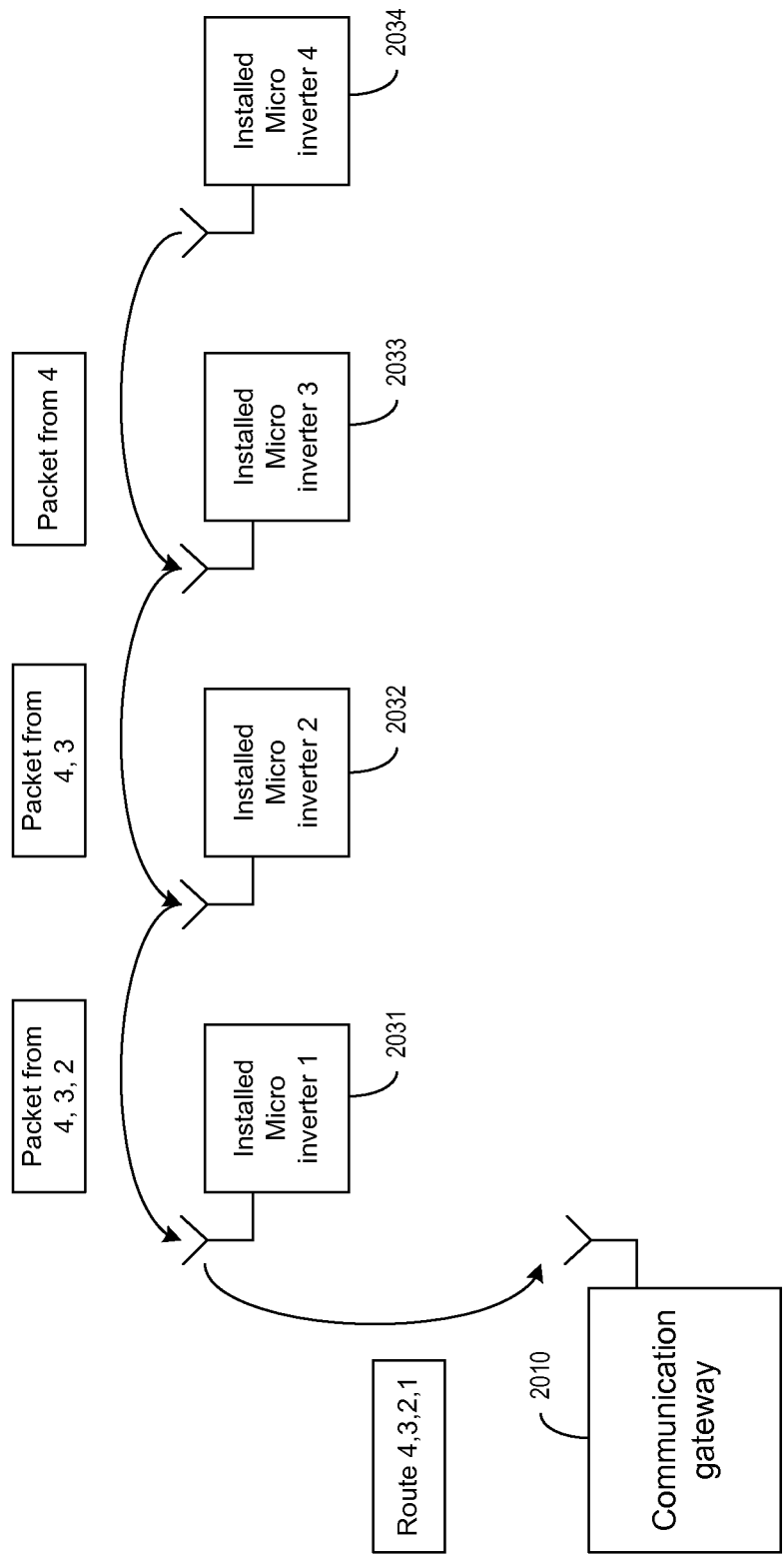
FIG. 20 illustrates using hop routes to determine relative positions of a micro-inverter relative to neighboring devices.

FIG. 20 illustrates using hop routes to determine relative positions of a micro-inverter relative to neighboring devices. The micro-inverters are in a mesh-based network in which data packets are relayed from one device to another and route taken by the packet are recorded. As illustrated, the micro-inverter 2031 receives data packet from micro-inverter 2032, the micro-inverter 2032 receives data packet from micro-inverter 2033, and the micro-inverter 2033 in turn receives data packet from the micro-inverter 2034. In this particular protocol, the route taken by a packet as it hops from device to device is recorded. The micro-inverter 2031, after receiving a packet that is recorded as having traveled through micro-inverters 2034, 2033, and 2032, report to the communications gateway 2010 it has received a packet that went through such a sequence of hops. Based on this information, a local map for the micro-inverter 2031 can be constructed based on the recorded sequence of hops. In the example of FIG. 20, this local map would indicate that the relative position of the micro-inverter 2031 is adjacent to micro-inverter 2032, which is adjacent to the micro-inverter 2033, which is in turn adjacent to the micro-inverter 2034.

The "nearest neighbor" micro-inverters may not be exactly adjacent. This can occur when the strengths of transmission signals in the array are strong enough such that a micro-inverter cannot determine which of the signals that it receives is truly from the "nearest neighbor". Some embodiments therefore perform a hop-route algorithm by reducing RF transmit signal strengths such that only the adjacent devices are in communication.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
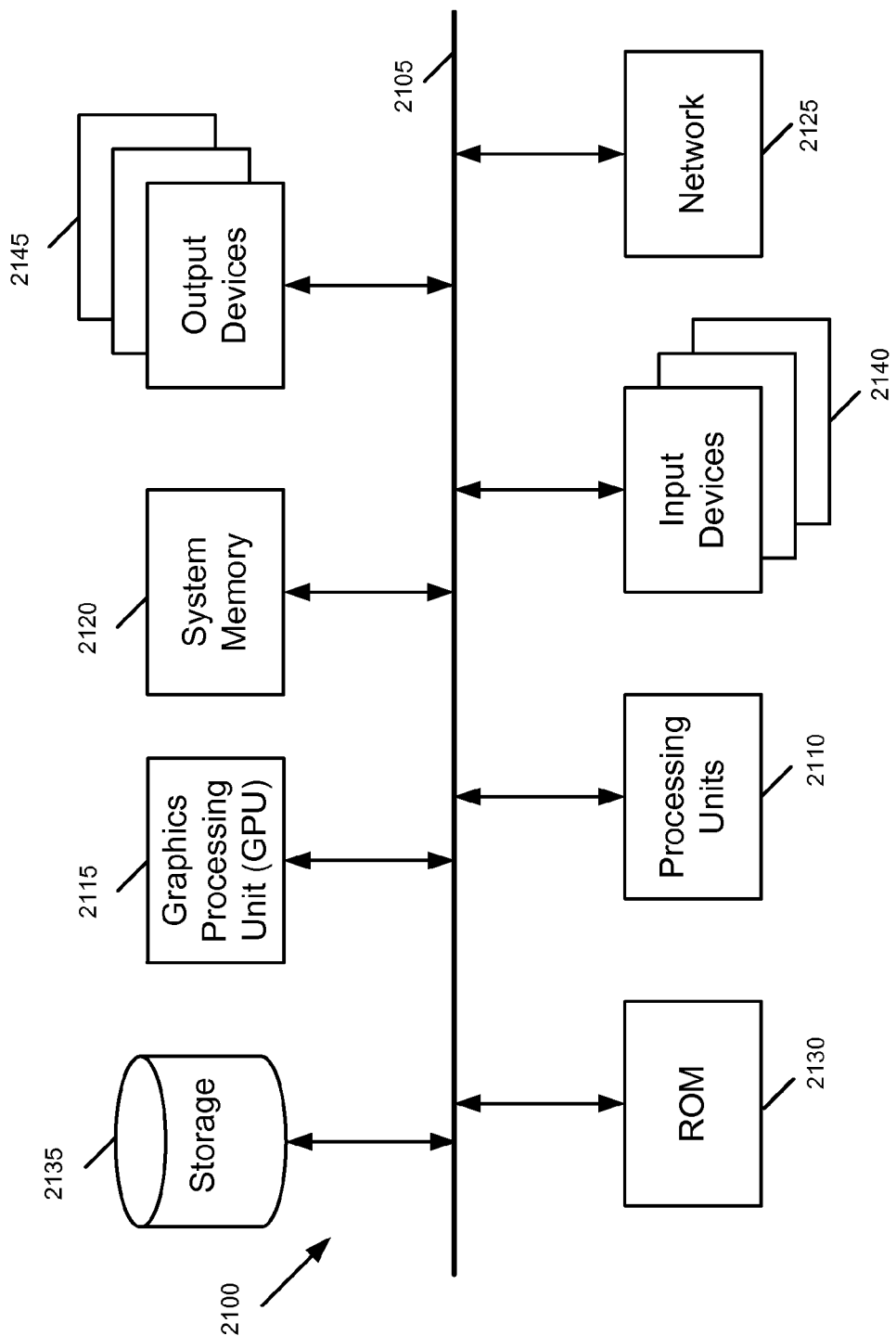
FIG. 21 conceptually illustrates a computer system with which some embodiments of the invention are implemented.

FIG. 21 conceptually illustrates an electronic system 2100 with which some embodiments of the invention are implemented. The electronic system 2100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2100 includes a bus 2105, processing unit(s) 2110, a graphics processing unit (GPU) 2115, a system memory 2120, a network 2125, a read-only memory (ROM) 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the GPU 2115, the system memory 2120, and the permanent storage device 2135.

From these various memory units, the processing unit(s) 2110 retrieves instructions to execute and data to process in order to execute the processes of the invention. The processing unit(s) may be a single processor or a multi-core processor in different embodiments. Some instructions are passed to and executed by the GPU 2115. The GPU 2115 can offload various computations or complement the image processing provided by the processing unit(s) 2110. In some embodiments, such functionality can be provided using CoreImage's kernel shading language.

The read-only-memory ROM 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash memory device, etc., and its corresponding disk drive) as the permanent storage device. Like the permanent storage device 2135, the system memory 2120 is a read-and-write memory device. However, unlike storage device 2135, the system memory 2120 is a volatile read-and-write memory, such a random access memory. The system memory 2120 stores some of the instructions and data that the processor needs at runtime. In some embodiments, the invention's processes are stored in the system memory 2120, the permanent storage device 2135, and/or the read-only memory 2130. For example, the various memory units include instructions for processing multimedia clips in accordance with some embodiments. From these various memory units, the processing unit(s) 2110 retrieves instructions to execute and data to process in order to execute the processes of some embodiments.

The bus 2105 also connects to the input and output devices 2140 and 2145. The input devices 2140 enable the user to communicate information and select commands to the electronic system. The input devices 2140 include alphanumeric keyboards and pointing devices (also called "cursor control devices"), cameras (e.g., webcams), microphones or similar devices for receiving voice commands, etc. The output devices 2145 display images generated by the electronic system or otherwise output data. The output devices 2145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 21, bus 2105 also couples electronic system 2100 to a network 2125 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 8, 11, 17, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory computer readable storage medium storing a computer program executable by at least one processor, the computer program comprising sets of instructions for:
    gathering information relating to positions of a plurality of energy-harvesting devices in a two dimensional array arranged in a series of rows, wherein the gathered information comprises:
        a time stamp for each energy harvesting device indicating a sequence of installation for the plurality of energy-harvesting devices;
        a signal strength measurement from a common reference node for each energy harvesting device, wherein a measured change in signal strength between two sequential energy harvesting devices is used to indicate a change in rows in the two dimensional array; and
    generating a map of the energy-harvesting devices that identifies locations of the energy-harvesting devices in the two dimensional array by using the gathered information.

2. The non-transitory computer readable storage medium of claim 1, wherein the set of instructions for generating the map comprises a set of instructions for using an automated process to identify the locations of the energy-harvesting devices based on the gathered information.

3. The non-transitory computer readable storage medium of claim 1, wherein the gathered information comprises global positioning coordinates of the plurality of energy-harvesting device.

4. The non-transitory computer readable storage medium of claim 1, wherein the generated map comprises a topological map that includes relative positions of the energy-harvesting devices within the physical installation based on the identified locations.

5. The non-transitory computer readable storage medium of claim 1, wherein the generated map comprises a geometric map that includes absolute geographical positions of the energy-harvesting devices based on the identified locations.

6. The non-transitory computer readable storage medium of claim 1, wherein the set of instructions for gathering information comprising a set of instructions for using a communications network to collect information from the energy harvesting devices, the communications network comprising a communications gateway for receiving the collected information from the energy harvesting devices.

7. The non-transitory computer readable storage medium of claim 6, wherein the computer program further comprises a set of instructions for generating the map at the communications gateway based on the received information.

8. The non-transitory computer readable storage medium of claim 7, wherein the computer program further comprises a set of instructions for displaying the generated map at the communications gateway.

9. The non-transitory computer readable storage medium of claim 6, wherein the computer program further comprises a set of instructions for storing the collected information at a server.

10. The non-transitory computer readable storage medium of claim 9, wherein the computer program further comprises a set of instructions for generating the map using the information stored at the server.

11. The non-transitory computer readable storage medium of claim 10, wherein the computer program further comprises a set of instructions for displaying the generated map.

12. The non-transitory computer readable storage medium of claim 10, wherein the server is a first server, the computer program further comprising a set of instructions for transmitting the generated map to a second server for viewing.

13. A method comprising:
    receiving a first global positioning (GPS) location from a first anchor node, wherein the first GPS location is generated by a first GPS receiver of the first anchor node;
    receiving a second GPS location from a second anchor node, wherein the second GPS location is generated by a second GPS receiver of the second anchor node;
    receiving a time stamp for each energy harvesting device in a plurality of energy harvesting devices in a two dimensional array indicating a sequence of installation for the plurality of energy-harvesting devices;
    receiving a signal strength reading from the first and or the second anchor node for each energy harvesting device in the plurality of energy harvesting devices, wherein a measured change in signal strength between two sequential energy harvesting devices is used to indicate a change in rows in the two dimensional array
    determining locations of each of the plurality of energy harvesting devices within the two dimensional array based on the received time stamp and signal strength reading for each of the energy harvesting devices and the first and second GPS locations; and
    generating, at a computing device, an installation layout of the plurality of energy harvesting devices based on the determined locations.

14. The method of claim 13, wherein the two dimensional array comprises the plurality of energy harvesting devices, and wherein the first anchor node is installed in a left corner of the array and the second anchor node is installed in a right corner of the array.

15. The method of claim 13, wherein the two dimensional array comprises the plurality of energy harvesting devices, and wherein the first and second anchor nodes are included in a first and second energy harvesting device, respectively, in the plurality of energy harvesting devices.

16. The method of claim 15, wherein the first and second energy harvesting devices are installed at corners of the two dimensional array.

17. The method of claim 13 further comprising receiving a time of arrival of a signal from each of the energy-harvesting device to an anchor node, wherein determining the locations of each of the plurality of energy-harvesting devices is further based on the received time of arrival signals from the energy-harvesting element.

18. The method of claim 13 further comprising receiving an angle of incidence of a signal from each of the energy-harvesting device to an anchor node, wherein determining the locations of each of the plurality of energy-harvesting devices is further based on the received angle of incidence of the signal from the energy-harvesting element.

19. A method comprising:
receiving, at a computing device, a set of information from a communications network comprising a plurality of energy-harvesting devices, the set of information relating to positions of the plurality of energy-harvesting devices in a two dimensional array, wherein the set of information comprises a timestamp for each energy-harvesting device that indicates when the energy-harvesting device is installed and activated, and a signal strength measurement for each energy-harvesting device from a common reference node wherein a measured change in signal strength between two sequential energy harvesting devices is used to indicate a change in rows in the two dimensional array;
based on the timestamps and the signal strength measurement in the received information, determining an installation location for each energy harvesting device in the two dimensional array; and
generating an installation layout for the plurality of energy-harvesting devices based on the determined installation locations.

20. The method of claim 19, wherein the set of information comprises global positioning coordinates of the plurality of energy-harvesting device, wherein a global positioning coordinate for an energy-harvesting device is provided by a mobile device equipped with a global positioning system (GPS) near the energy-harvesting device.

21. The method of claim 19, wherein the set of information comprises a timestamp that further indicates when a particular energy harvesting device first communicates with a communications gateway in the communications network.

22. The method of claim 21, wherein each of the plurality of energy-harvesting devices is installed and activated according to a predetermined sequence.

23. The method of claim 22, wherein the signal strength measurement is used to determine whether a particular energy-harvesting device is in a same row or column as another energy-harvesting device that is installed and activated immediately before the particular energy-harvesting device.

* * * * *